US005298192A

United States Patent [19]

Hattori et al.

[11] Patent Number: 5,298,192

[45] Date of Patent: Mar. 29, 1994

[54] SUBBING COMPOSITION FOR POLYESTER

[75] Inventors: Yasushi Hattori, Kanagawa; Nobuyuki Sugiyama, Shizuoka; Akira Hatakeyama, Kanagawa, all of Japan

[73] Assignee: Fuji Photo Film Co., Ltd., Kanagawa, Japan

[21] Appl. No.: 58,215

[22] Filed: May 10, 1993

Related U.S. Application Data

[62] Division of Ser. No. 863,235, Apr. 13, 1992, Pat. No. 5,232,825.

[30] Foreign Application Priority Data

Apr. 5, 1991 [JP] Japan .................................. 3-99678

[51] Int. Cl.[5] ............................................ B01J 13/00

[52] U.S. Cl. ................................... 252/311; 428/480; 252/302; 252/303; 430/510; 430/513; 430/517; 430/523; 430/531; 430/533; 430/534; 430/535

[58] Field of Search ................ 428/480; 430/510, 513, 430/517, 523, 534, 533, 535; 252/302, 303, 304, 311

[56] References Cited

U.S. PATENT DOCUMENTS

| | | | |
|---|---|---|---|
| 4,287,298 | 9/1981 | Dodwell | 430/535 |
| 4,302,505 | 11/1981 | Heberger | 430/535 |
| 4,855,392 | 8/1989 | Chen | 430/535 |
| 4,933,367 | 6/1990 | Ishigaki et al. | 430/535 |
| 4,950,596 | 8/1990 | Diehl et al. | 430/512 |
| 4,977,071 | 12/1990 | Kanetake et al. | 430/535 |
| 5,124,242 | 6/1992 | Hattori et al. | 430/513 |

*Primary Examiner*—Jack P. Brammer
*Attorney, Agent, or Firm*—Sughrue, Mion, Zinn, Macpeak & Seas

[57] ABSTRACT

Disclosed is a subbing composition for polyesters, comprising a dye, a hydrophilic colloid, and a latex, wherein said dye is dispersed in the form of fine solid grains which are substantially insoluble in water at a pH of 6 or less, and are substantially soluble in water at a pH of 8 or more, and said latex has a glass transition temperature of 35° C. or lower, and a method for coating thereof. In addition, a subbing layer-coated article is disclosed wherein said subbing composition is coated on a polyester base. Finally, a silver halide photographic material is disclosed wherein a photographic emulsion layer is coated on said subbing layer-coated article.

5 Claims, No Drawings

SUBBING COMPOSITION FOR POLYESTER

This is a divisional of application No. 07/863,235 filed Apr. 3, 1992now U.S. Pat. Ser. No. 5,232,825.

FIELD OF THE INVENTION

The present invention relates to a subbing composition for polyesters. In particular, the present invention relates to a subbing composition for polyesters which contain a dye dispersed therein in the form of fine solid grains along with a latex, and which may form a subbing coat with improved scratch-resistance on polyester articles; a polyester article coated with the subbing coat; and, additionally, the present invention relates to a silver halide photographic material made of the coated polyester support.

BACKGROUND OF THE INVENTION

In preparing silver halide photographic materials, coloration of photographic emulsion layers and other layers is often affected for the purpose of absorbing light within a particular wavelength range.

For the purpose of preventing the halation or blurring of a photographic image to be formed in a photographic material (which is caused by re-introduction of light passing through the photographic emulsion layer or scattering after passing through said photographic emulsion layer into the photographic emulsion layer after reflection by the interface between the emulsion layer and the support or by the surface of the material which is opposite to the emulsion layer), a colored layer is often provided between the photographic emulsion layer and the support or on the surface of the support which is opposite to the photographic emulsion layer. Such a colored layer is called an anti-halation layer.

In X-ray photographic materials, a colored layer is often provided for the purpose of improving the sharpness as a crossover-cutting filter capable of reducing the crossover light to be introduced into the material.

Such a colored layer is mostly made of a hydrophilic colloid. For coloration of the layer, a dye(s) is/are incorporated into the layer. Potential dyes to be used for this purpose must satisfy the following conditions:

(1) The dyes must have a suitable spectral absorbability in accordance with the use and object.

(2) The dyes must be photo-chemically inactive. That is, they do not have any bad chemical influences on the photographic property of silver halide photographic emulsion layers constituting the photographic material; for instance, they do not lower the sensitivity and do not cause latent image fading and fogging.

(3) The dyes are decolored or dissolved and then removed in the step of photographic processing the photographic materials containing them so that they do not leave any harmful coloration in the processed photographic materials.

Where a colored layer such as an anti-halation layer or a crossover-cutting layer is made of a hydrophilic colloid, it results in an increase of the bulk of the water-permeable layer such that the drying property of the photographic material during development is disadvantageously worsened.

In order to overcome this drawback, fixation of dye(s) in a layer to be provided between a hydrophilic colloid layer and a support so as to elevate the adhesiveness between them is accomplished.

The layer having a function of sticking a support and a hydrophilic colloid layer to each other is herein called a subbing layer. There are many methods for fixing dye(s) in such a subbing layer; for example, there is: a method of adsorbing dye(s) to a mordant agent in the subbing layer (JP-A-1-126645) (the term "JP-A" as used herein means an "unexamined published Japanese patent application"); a method of emulsifying and dispersing an oily solution of dye(s) in the subbing layer in the form of oily drops (JP-A-1-142688); a method of adsorbing dye(s) on surfaces of inorganic substances in the subbing layer (Japanese Patent Application No. 1-139691 corresponding to JP-A-3-5748); a method of adsorbing dye(s) to a polymer in the subbing layer (JP-A2-298939); and, a method of directly dispersing solid dye(s) as they are in the subbing layer (Japanese Patent Application No. 1-87367 corresponding to JP-A-2-264936).

Of these methods, preferred is the method of directly dispersing solid dye(s) as they are in a subbing layer since the dye(s) may be fixed in a determined layer, and the processed photographic material has little residual color caused by the incorporated dye(s).

The amount of hydrophilic colloid to be used in a subbing layer is generally small; for example, 0.5 $g/m^2$ or less.

Where a dye dispersed in the form of fine solids grains is introduced into such a hydrophilic colloid layer, the film itself, as coated with the layer, would thereby be more brittle so that the surface of the coated layer could easily be scratched. The optical density of the dye in the scratched area is to be lower than that in the normal area.

The scratched area having such a lowered optical density is to have an increased crossover light, which would therefore have harmful influences on the photographic properties of the photographic material. In addition, if the scratched dust adheres to the base of the material, the dust-adhered area is to have a decreased crossover light and would also have harmful influences on the photographic properties of the same.

As mentioned above, decreasing the scratch-resistance of the surface of the coated subbing layer is a serious problem.

SUMMARY OF THE INVENTION

The object of the present invention is to provide a subbing layer-coated polyester article having an improved scratch-resistance and to provide a silver halide photographic material having a substantially residual color-free anti-halation layer or crossover-cutting layer and, therefore, capable of being processed by rapid processing to give a photographic image with an improved quality.

In order to attain the above-mentioned objects, there is provided in accordance with the present invention, a subbing composition for polyesters, comprising a dye, a hydrophilic colloid and a latex; wherein said dye is dispersed in the form of fine solid grains which are substantially insoluble in water at pH of 6 or less, and which are substantially soluble in water at pH of 8 or more, and said latex has a glass transition temperature of 35° C. or lower. Using this composition, the coated subbing layer is to have an improved scratch-resistance. There is also provided in accordance with the present invention a silver halide photographic material having a substantially residual color-free anti-halation layer or crossover-cutting layer, which is prepared by coating a photographic emulsion layer on the subbing layer-coated article.

DETAILED DESCRIPTION OF THE INVENTION

As polyesters for use in the present invention, polyethylene terephthalate is desired. Where they are used for preparing photographic materials, a filmy polyethylene terephthalate (hereinafter referred to as "PET") is desired.

It is preferred that the surface of PET is pre-treated by corona-discharging treatment, glow-discharging treatment or ultraviolet-irradiating treatment so as to improve the adhesiveness between the surface and hydrophilic colloid. As the case may be, a pre-subbing layer (first subbing layer) composed of a styrene-butadiene latex or vinylidene chloride latex may optionally be provided on PET for the same purpose.

As hydrophobic polymers to be used for forming a first subbing layer, there are mentioned styrene-butadiene copolymers, vinylidene chloride copolymers, water-soluble polyesters and polyacrylates. Preferred are styrene-butadiene copolymers and vinylidene chloride copolymers; and more preferred are styrene-butadiene copolymers.

Styrene-butadiene copolymers to be used for this purpose may be those composed of styrene and butadiene being from 9/1 to 1/9, or they may additionally contain a third comonomer component of acrylic acid or the like.

The amount of the hydrophobic polymer to be in the first subbing layer is desirably from 100 to 500 $mg/m^2$.

As coating devices, there is known an extrusion slide hopper coating device (U.S. Pat. Nos. 2,761,417, 2,761,418, 2,761,791), and a curtain coating device (U.S. Pat. No. 3,206,323). In the present invention, where the amount of the coating composition for forming the first subbing layer is small, the composition is desired to be coated with a bar coater.

If the drying temperature for the coated first subbing layer is too low, firm adhesion between PET and the first subbing layer formed thereon can not be attained. Therefore, the drying temperature of the first subbing layer is desired to fall within the range of 80° to 200° C.

The hydrophobic polymer to be in the coating composition of forming the subbing layer is in the form of an aqueous latex, which may further contain, if desired, other additives such as a crosslinking agent, a surfactant, a swelling agent, a matting agent and an antistatic agent.

As usable crosslinking agents, there is mentioned, for example, triazine compounds described in U.S. Pat. Nos. 3,325,287, 3,288,775 and 3,549,377, and Belgian Patent 6,602,226; dialdehyde compounds described in U.S. Pat. Nos. 3,291,624 and 3,232,764, French Patent 1,543,694 and British Patent 1,270,578; epoxy compounds described in U.S. Pat. No. 3,091,537, and JP-B-49-26580 (the term "JP-B" as used herein means an "examined Japanese patent publication"); vinyl compounds described in U.S. Pat. No. 3,642,486; aziridine compounds described in U.S. Pat. No. 3,392,024; ethyleneimine compounds described in U.S. Pat. No. 3,549,378; and methylol compounds.

Of these compounds, preferred are dichlorotriazine derivatives.

It is desired that the subbing composition of the present invention is coated on the above-mentioned first subbing layer as a second subbing layer. For the purpose of intensifying the adhesiveness between the first subbing layer and the second subbing layer, the drying temperature of the coated second subbing layer is desired to fall within the range of 80° to 200° C. If the drying temperature is too high, the dye(s) to be in the second subbing layer would migrate into the polymer layer of the first subbing layer. Therefore, the drying temperature is especially preferable from 80° to 155° C.

For the purpose of intensifying the adhesiveness between the first subbing layer and the second subbing layer, the surface of the first subbing layer may be treated by corona-discharging treatment, glow-discharging treatment or ultraviolet-irradiating treatment.

It is necessary that the subbing composition of the present invention contains: a dye dispersed therein in the form of fine solid grains which are substantially insoluble in water at pH of 6 or less, and which are substantially soluble in water at pH of 8 or more; a hydrophilic colloid; and, a latex.

For dispersing a dye in the form of fine solid grains, known methods, such as those described in WO88/04794 and EP-A-0276566, may be referred to.

Dyes which are usable in the present invention in the form of dispersions of fine solid grains include dyes described in Table I to Table X in WO88/04794, among others, having the following formulae (I) to (VII):

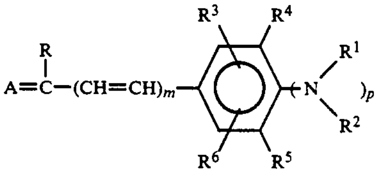
(I)

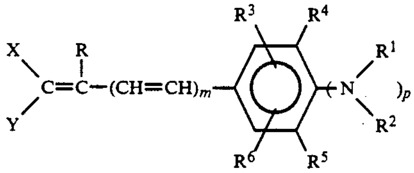
(II)

$$A=L^1-(L^2=L^3)_n-A'$$ (III)

$$A=(L^1=L^2)_{2-q}-B$$ (IV)

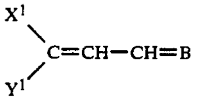
(V)

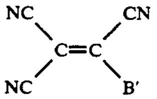
(VI)

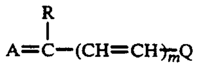
(VII)

In these formulae, A and A' may be the same or different from each other, and each represents an acidic nucleus; B represents a basic nucleus; X and Y may be the same or different from each other, and each represents an electron attracting group; R represents a hydrogen atom or an alkyl group; $R^1$ and $R^2$ each represents an alkyl group, an aryl group, an acyl group or a sulfonyl group, and $R^1$ and $R^2$ may be bonded to each other to form a 5-membered or 6-membered ring; $R^3$ and $R^6$ each represents a hydrogen atom, a hydroxyl group, a carboxyl group, an alkyl group, an alkoxy group, or a halogen atom; $R^4$ and $R^5$ are both hydrogen atoms, or they may each be a non-metallic atomic group necessary for forming a 5-membered or 6-membered ring by $R^1$ and $R^4$, or $R^2$ and $R^5$, being bonded to each other; $L^1$, $L^2$ and $L^3$ each represents a methine group; m represents 0 or 1; n and q each represents 0, 1 or 2; p represents 0 or 1, and when p is 0, then $R^3$ represents a hydroxyl group or a carboxyl group and $R^4$ and $R^5$ are both hydrogen atoms; B' represents a heterocyclic group having a carboxyl group, a sulfamoyl group or a sulfonamido group; and Q represents a heterocyclic group.

Compounds of formulae (I) to (VII) must each have at least one dissociating group having a pKa value of 4 to 11 in a mixed solution of water and ethanol (1/1, by volume), per molecule.

Compounds of formulae (I) to (VII) will be explained in detail hereunder.

The acidic nucleus to be represented by A or A' is preferably a nucleus of 2-pyrazolin-5-one, rhodanine, hydantoin, thiohydantoin, 2,4-oxazolidinedione, isoxazolidinone, barbituric acid, thiobarbituric acid, indanedione, pyrazolopyridine or hydroxypyridone.

The basic nucleus to be represented by B is preferably a nucleus of pyridine, quinoline, indolenine, oxazole, benzoxazole, naphthoxazole or pyrrole.

As examples of hetero rings of B', there are mentioned pyrrole, indole, thiophene, furan, imidazole, pyrazole, indolidine, quinoline, carbazole, phenothiazine, phenoxazine, indoline, thiazole, pyridine, pyridazine, thiadiazine, pyrane, thiopyrane, oxadiazole, benzoquinolidine, thiadiazone, pyrrolothiazole, pyrrolopyridazine and tetrazole rings.

The hetero ring to be represented by Q is preferably a 5-membered hetero ring which may optionally be in the form of a benzo-condensed ring, more preferably a 5-membered nitrogen-containing hetero ring which may optionally be in the form of a benzo-condensed ring. As examples of hetero rings of Q, there are mentioned pyrrole, indole, pyrazole, pyrazolopyrimidone and benzindole rings.

The dissociating protonic group having a pKa (acid-dissociating constant) of from 4 to 11 in a mixed solution of water and ethanol (1/1, by volume), which is to be in the dyes for use in the present invention, is not specifically defined with respect to the kind and the substituting position in the dye molecule, provided that it makes the dye molecule substantially insoluble in water at pH of 6 or less and makes the same substantially soluble in water at pH of 8 or more. Preferably, the group includes a carboxyl group, a sulfamoyl group, a sulfonamido group and a hydroxyl group. More preferred is a carboxyl group. The dissociating group may directly be substituted in the dye molecule, or it may also be therein via a divalent linking group (for example, an alkylene group or phenylene group). As examples of the group bonded to the dye molecule via a divalent linking group, there is mentioned a 4-carboxyphenyl group, a 2-methyl-3-carboxyphenyl group, a 2,4-dicarboxyphenyl group, a 3,5-dicarboxyphenyl group, a 3-carboxyphenyl group, a 2,5-dicarboxyphenyl group, a 3-ethylsulfamoylphenyl group, a 4-phenylsulfamoylphenyl group, a 2-carboxyphenyl group, a 2,4,6-trihydroxyphenyl group, a 3-benzenesulfonamidophenyl group, a 4-(p-cyanobenzenesulfonamido)phenyl group, a 3-hydroxyphenyl group, a 2-hydroxyphenyl group, a 4-hydroxyphenyl group, a 2-hydroxy-4-carboxyphenyl group, a 3-methoxy-4-carboxyphenyl group, a 2-methyl-4-phenylsulfamoylphenyl group, a 4-carboxybenzyl group, a 2-carboxybenzyl group, a 3-sulfamoylphenyl group, a 4-sulfamoylphenyl group, a 2,5-disulfamoylphenyl group, a carboxymethyl group, a 2-carboxyethyl group, a 3-carboxypropyl group, a 4-carboxybutyl group, and a 8-carboxyoctyl group.

The alkyl group to be represented by R, $R^3$ or $R^6$ is preferably an alkyl group having from 1 to 10 carbon atoms. Examples thereof are a methyl group, an ethyl group, an n-propyl group, an isoamyl group and an n-octyl group.

The alkyl group to be represented by $R^1$ or $R^2$ is preferably an alkyl group having from 1 to 20 carbon atoms (e.g., methyl, ethyl, n-propyl, n-butyl, n-octyl, n-octadecyl, isobutyl, isopropyl), which may optionally be substituted by one or more substituents selected from a halogen atom (e.g., chlorine, bromine), a nitro group, a cyano group, a hydroxyl group, a carboxyl group, an alkoxy group (e.g., methoxy, ethoxy), an alkoxycarbonyl group (e.g., methoxycarbonyl, i-propoxycarbonyl), an aryloxy group (e.g., phenoxy), a phenyl group, an amido group (e.g., acetylamino, methanesulfonamido), a carbamoyl group (e.g., methylcarbamoyl, ethylcarbamoyl), and a sulfamoyl group (e.g., methylsulfamoyl, phenylsulfamoyl).

The aryl group to be represented by $R^1$ or $R^2$ is preferably a phenyl group or a naphthyl group, which may optionally be substituted by one or more substituents selected from those mentioned for the aforesaid alkyl group and an alkyl group (e.g., methyl, ethyl).

The acyl group to be represented by $R^1$ or $R^2$ is preferably an acyl group having from 2 to 10 carbon atoms, such as an acetyl, propionyl, n-octanoyl, n-decanoyl, isobutanoyl or benzoyl group. The alkylsulfonyl or arylsulfonyl group to be represented by $R^1$ or $R^2$ is preferably a methanesulfonyl, ethanesulfonyl, n-butanesulfonyl, n-octanesulfonyl, benzenesulfonyl, p-toluenesulfonyl or o-carboxybenzenesulfonyl group.

The alkoxy group to be represented by $R^3$ or $R^4$ is preferably an alkoxy group having from 1 to 10 carbon atoms, such as a methoxy, ethoxy, n-butoxy, n-octoxy, 2-ethylhexyloxy, isobutoxy or isopropoxy group. The halogen atom to be represented by $R^3$ or $R^6$ includes chlorine, bromine and fluorine atoms.

$R^1$ and $R^4$, or $R^2$ and $R^5$ may be bonded to each other to form a ring, which is, for example, a durolysine ring.

$R^1$ and $R^2$ may be bonded to each other to form a ring, which includes, for example, a piperazine ring, a morpholine ring and a pyrrolidine ring.

The methine group to be represented by $L^1$, $L^2$ or $L^3$ may have substituent(s) (such as methyl, ethyl, cyano, phenyl, chlorine, hydroxypropyl).

The electron attracting groups of $X^1$ and $Y^1$ may be same or different from each other, and they may be selected from a cyano group, a carboxyl group, an alkylcarbonyl group (which may optionally be substituted, e.g., acetyl, propionyl, heptanoyl, dodecanoyl, hexadecanoyl, 1-oxo-7-chloroheptyl), an arylcarbonyl group (which may optionally be substituted, e.g., benzoyl, 4-ethoxycarbonylbenzoyl, 3-chlorobenzoyl), an alkoxycarbonyl group (which may optionally be substituted, e.g., methoxycarbonyl, ethoxycarbonyl, butoxycarbonyl, t-amyloxycarbonyl, hexyloxycarbonyl, 2-ethylhexyloxycarbonyl, octyloxycarbonyl, decyloxycarbonyl, dodecyloxycarbonyl, hexadecyloxycarbonyl, octadecyloxycarbonyl, 2-butoxyethoxycarbonyl, 2-methylsulfonylethoxycarbonyl, 2-cyanoethoxycarbonyl, 2-(2-chloroethoxy)ethoxycarbonyl, 2-[2-(2-chloroethoxy)ethoxy]ethoxycarbonyl), an aryloxycarbonyl group (which may optionally be substituted, e.g., phenoxycarbonyl, 3-ethylphenoxycarbonyl, 4-ethylphenoxycarbonyl, 4-fluorophenoxycarbonyl, 4-nitrophenoxycarbonyl, 4-methoxyphenoxycarbonyl, 2,4-di-(t-amyl)phenoxycarbonyl), a carbamoyl group (which may optionally be substituted, e.g., carbamoyl, ethylcarbamoyl, dodecylcarbamoyl, phenylcarbamoyl, 4-methoxyphenylcarbamoyl, 2-bromophenylcarbamoyl, 4-chlorophenylcarbamoyl, 4-ethoxycarbonylphenylcarbamoyl, 4-propylsulfonylphenylcarbamoyl, 4-cyanophenylcarbamoyl, 3-methylphenylcarbamoyl, 4-hexyloxyphenylcarbamoyl, 2,4-di(t-amyl)phenoxycarbamoyl, 2-chloro-3-(dodecyloxycarbamoyl) phenylcarbamoyl, 3-(hexyloxycarbonyl)phenylcarbamoyl), a sulfonyl group (e.g., methylsulfonyl, phenylsulfonyl), and a sulfamoyl group (which may optionally be substituted, e.g., sulfamoyl, methylsulfamoyl).

Specific examples of dyes usable in the present invention are mentioned below, which, however, are not limited.

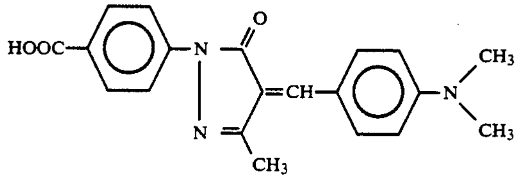

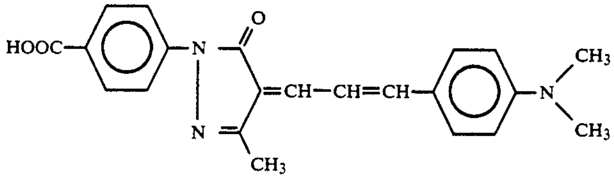

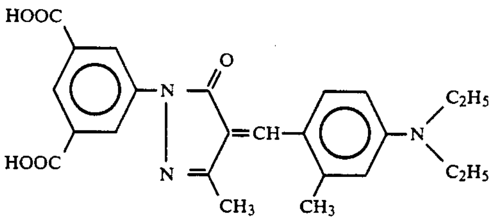

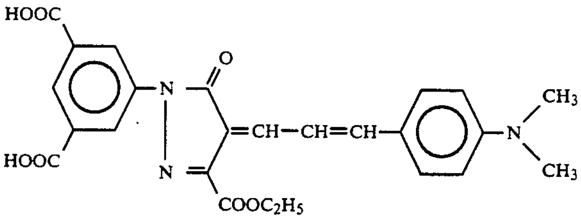

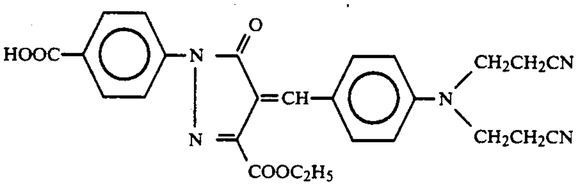

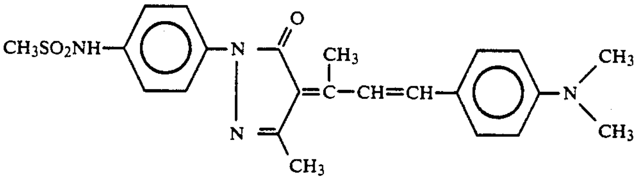

-continued
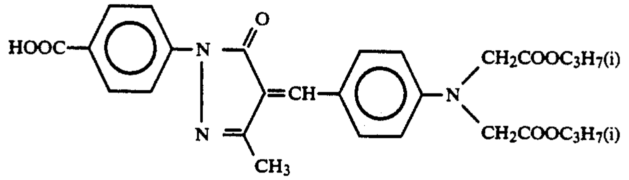
I-7
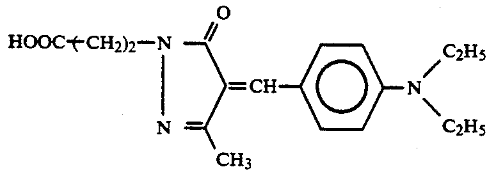
I-8
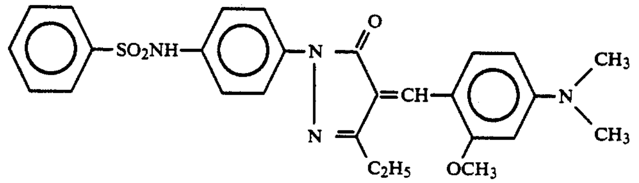
I-9
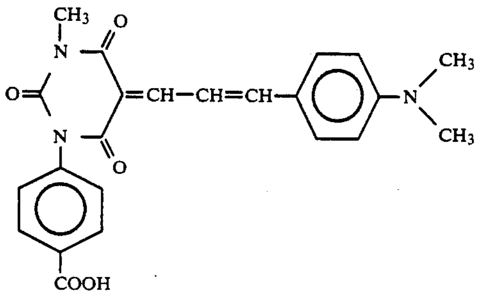
I-10
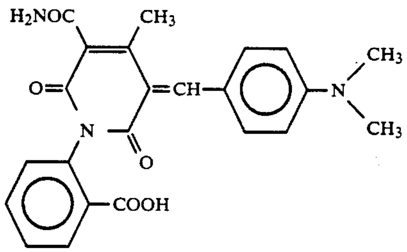
I-11
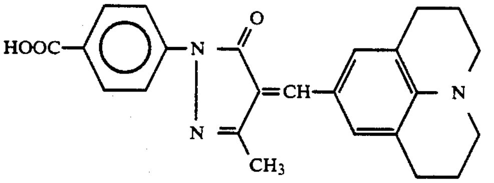
I-12
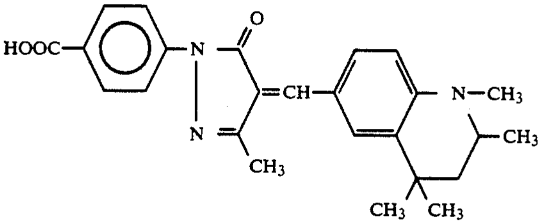
I-13

-continued
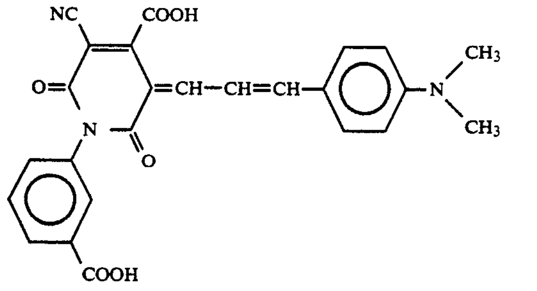
I-14
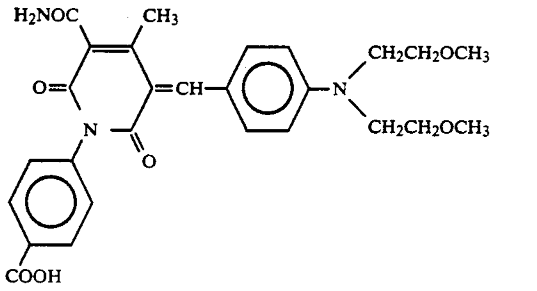
I-15
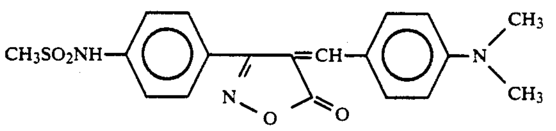
I-16
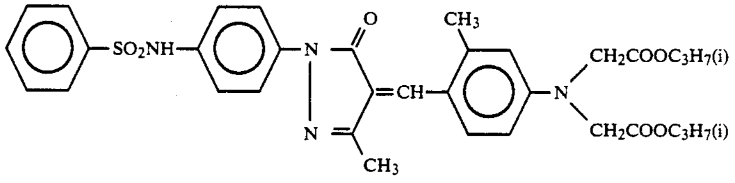
I-17
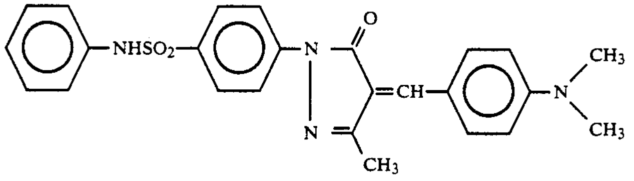
I-18
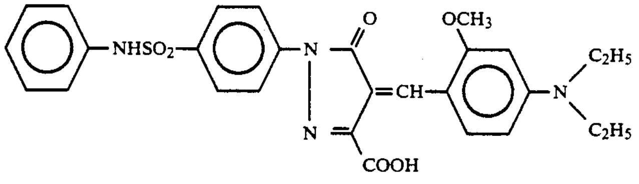
I-19
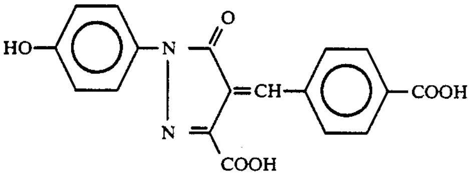
I-20

-continued
I-21
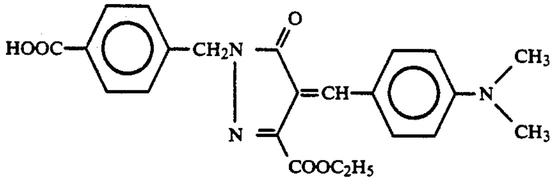
I-22
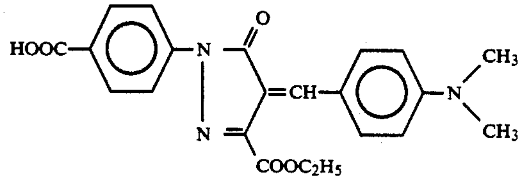
I-23
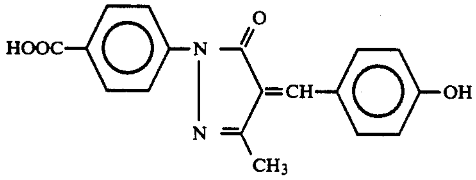
I-24
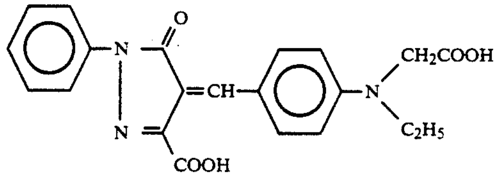
I-25
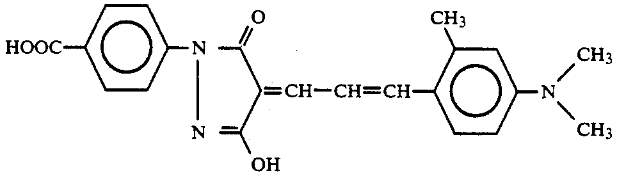
I-26
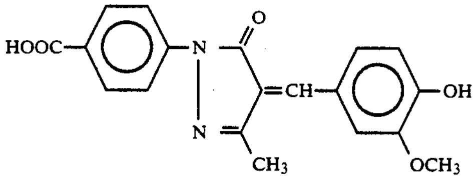
I-27
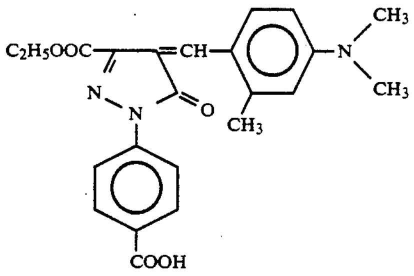
I-28
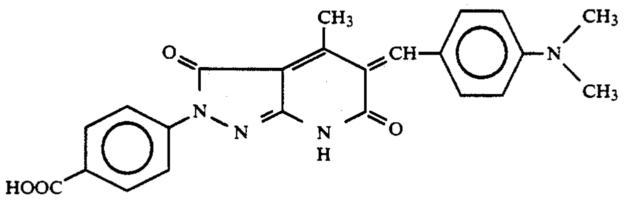

-continued
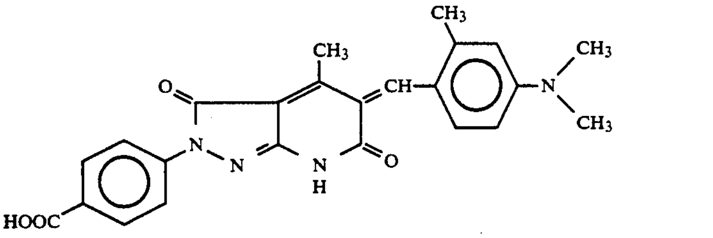
I-29
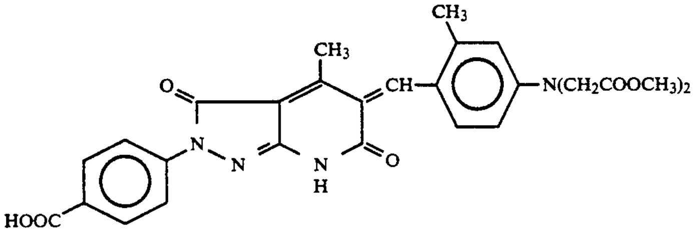
I-30
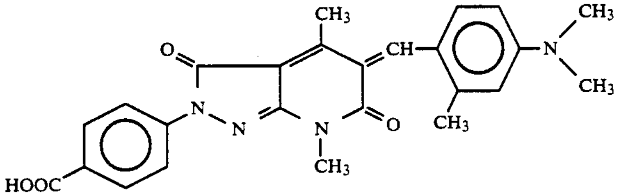
I-31
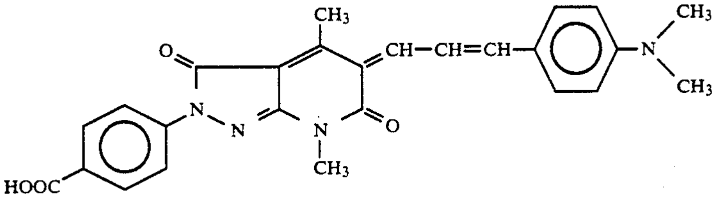
I-32
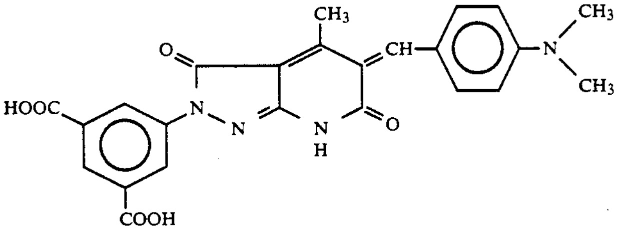
I-33
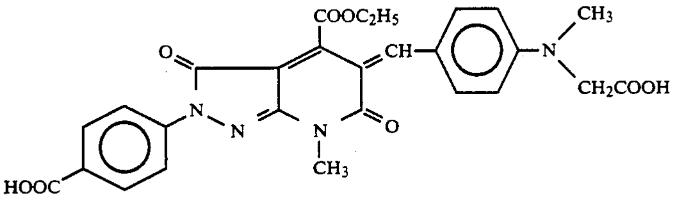
I-34
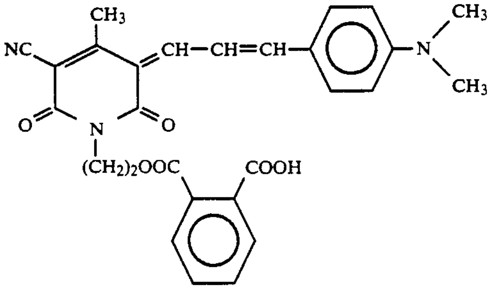
I-35

-continued
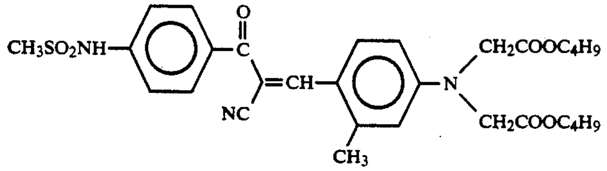
II-1
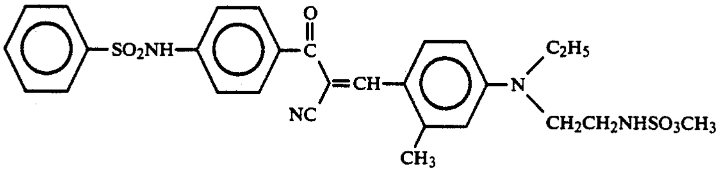
II-2
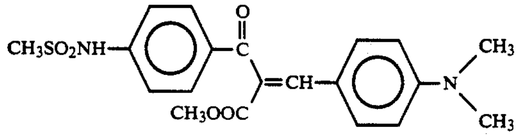
II-3
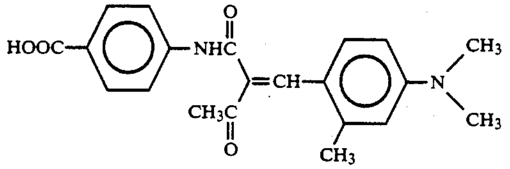
II-4
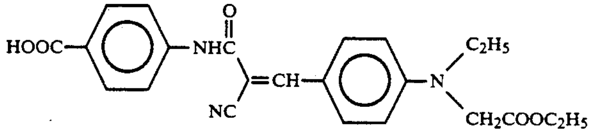
II-5
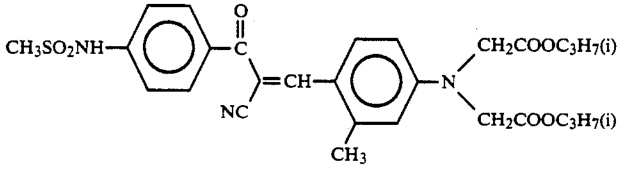
II-6
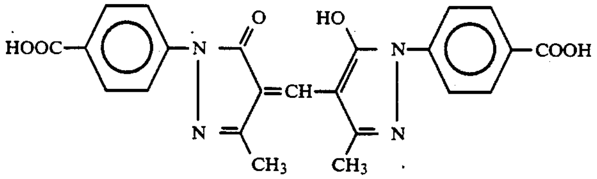
III-1
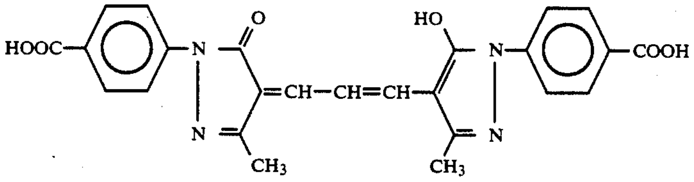
III-2
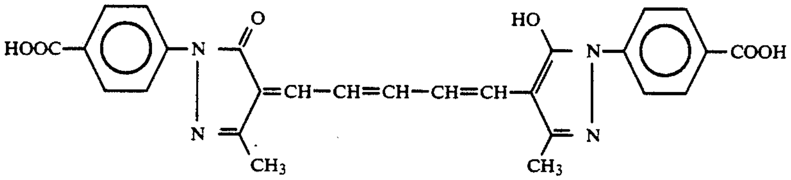
III-3

-continued
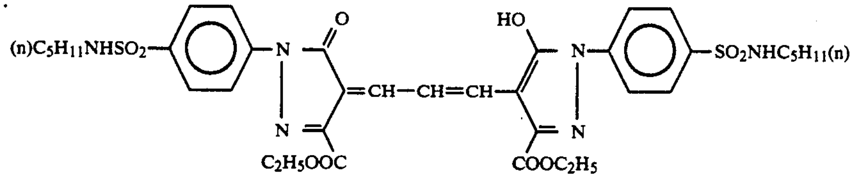
III-4
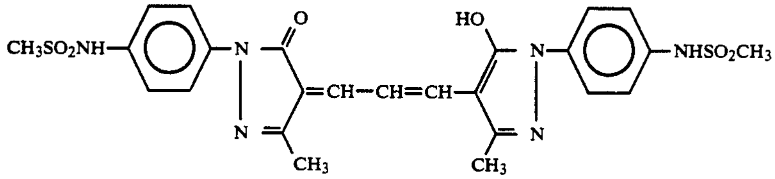
III-5
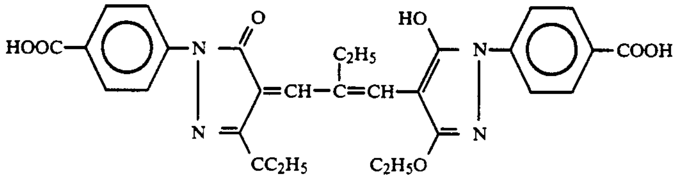
III-6
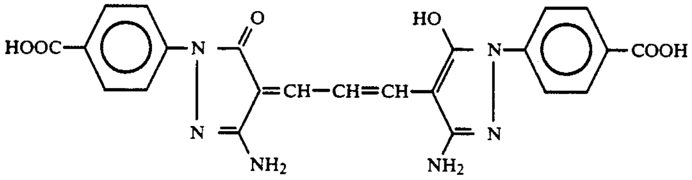
III-7
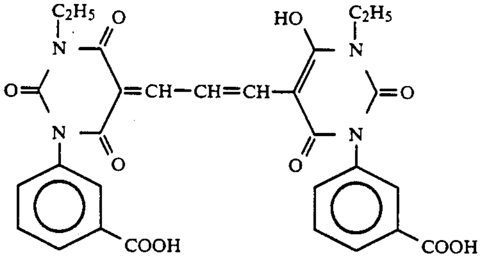
III-8
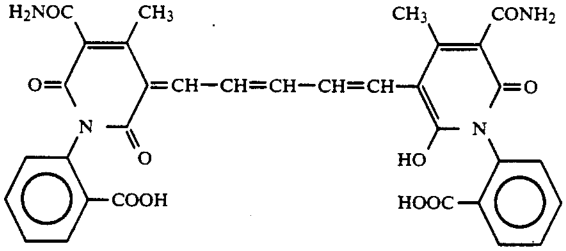
III-9
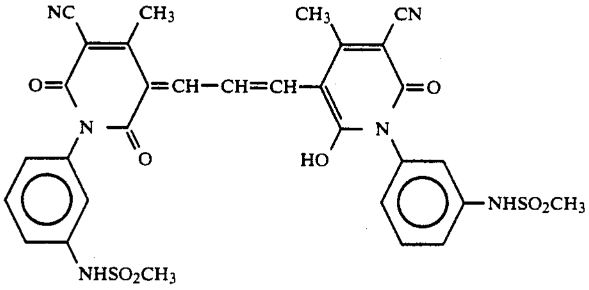
III-10

-continued
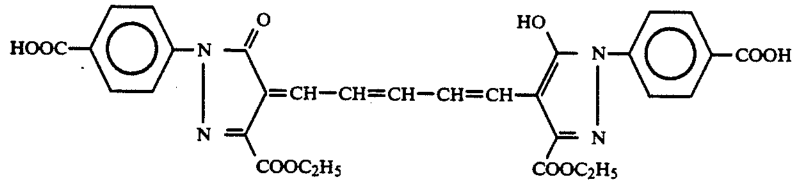
III-11
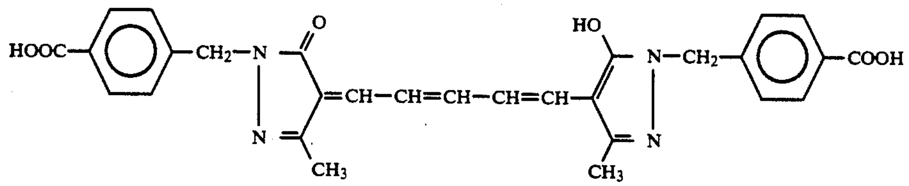
III-12
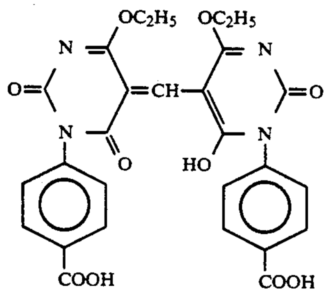
III-13
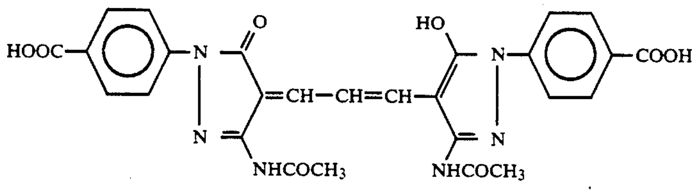
III-14
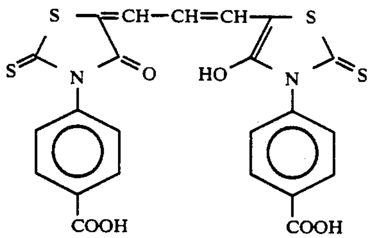
III-15
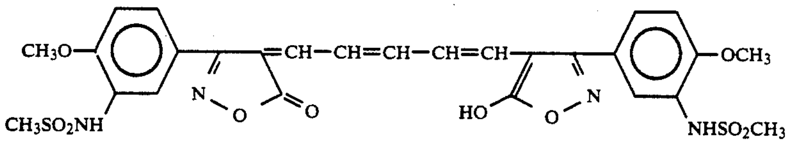
III-16
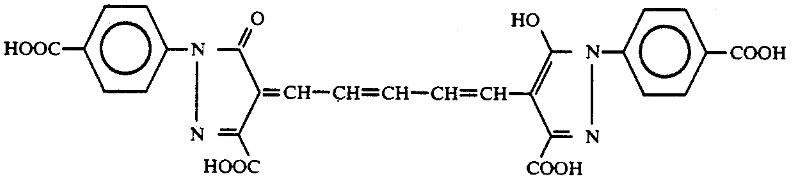
III-17

-continued
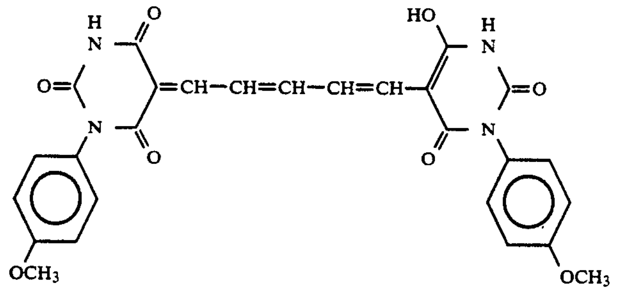
III-18
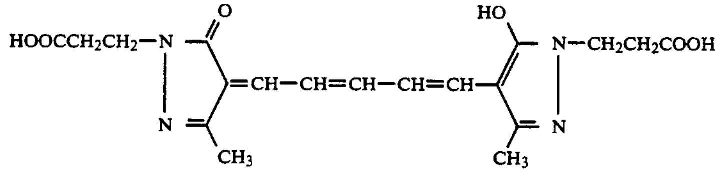
III-19
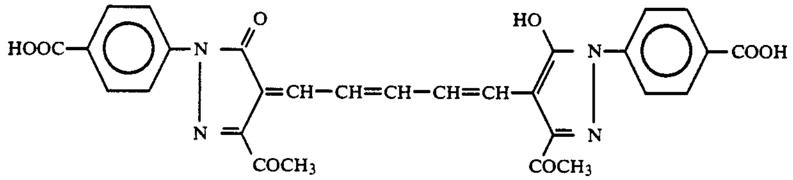
III-20
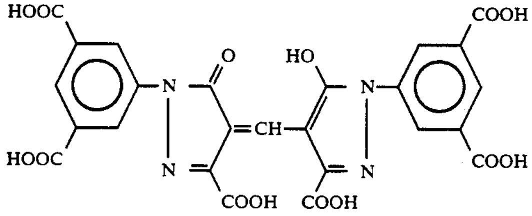
III-21
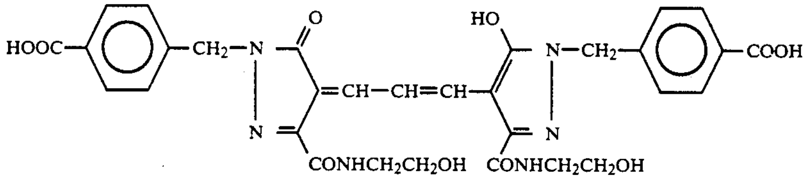
III-22
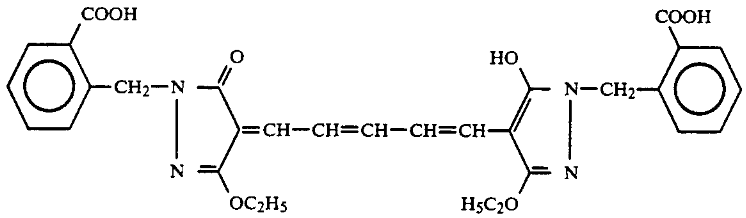
III-23
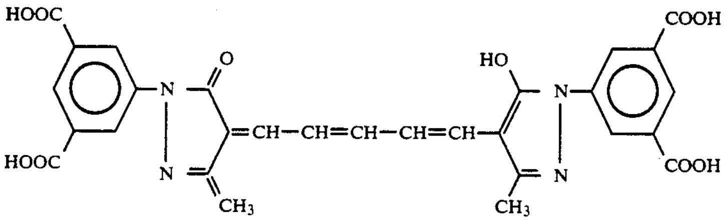
III-24

-continued
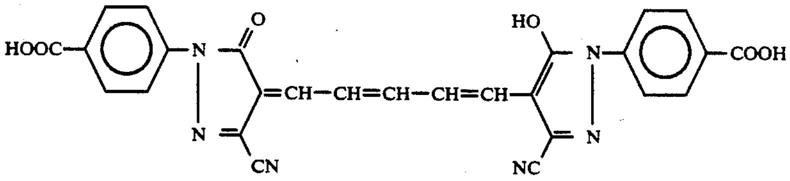
III-25
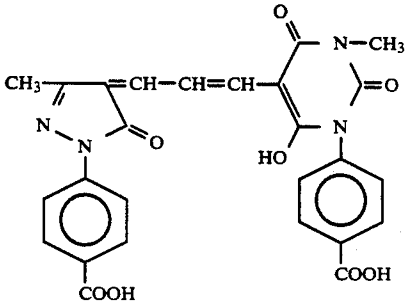
III-26
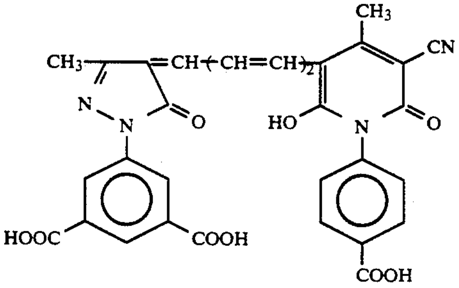
III-27
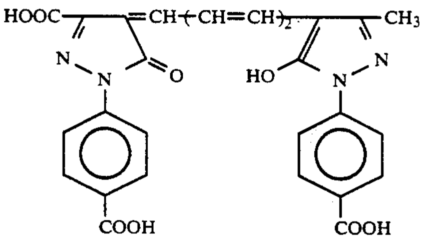
III-28
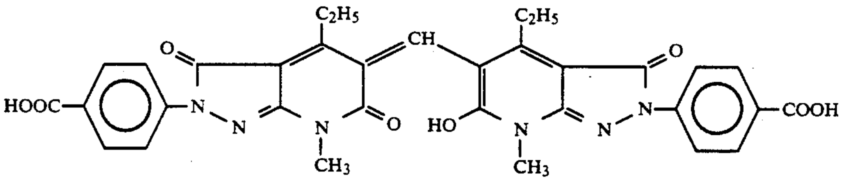
III-29
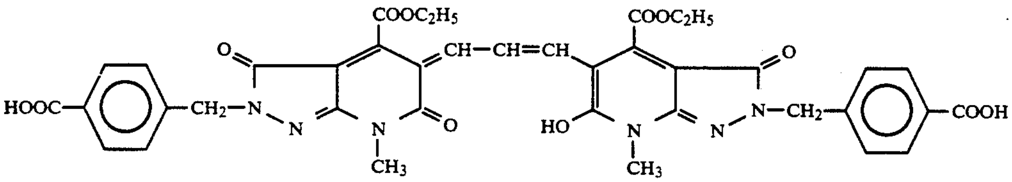
III-30
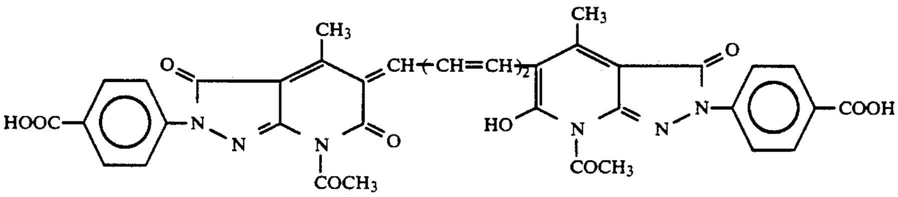
III-31

-continued
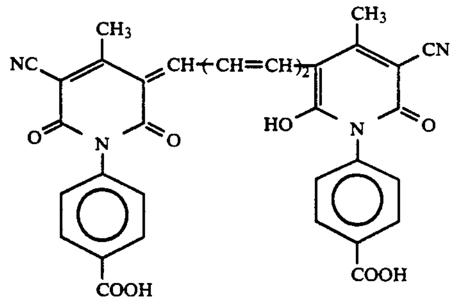
III-32
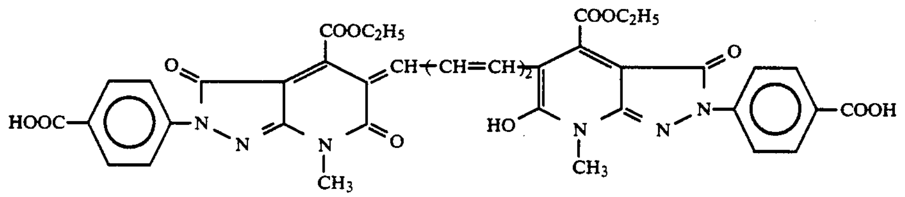
III-33
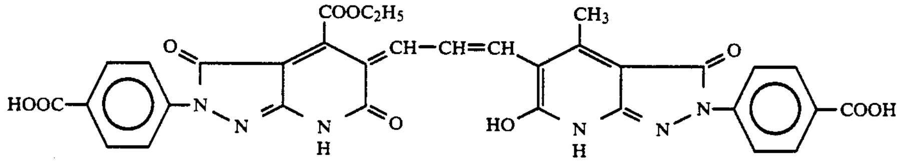
III-34
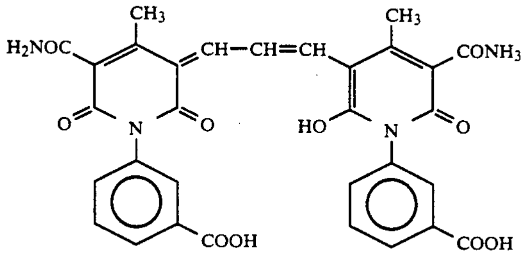
III-35
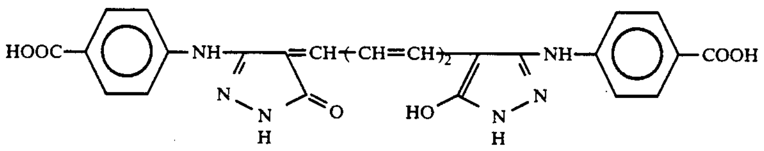
III-36
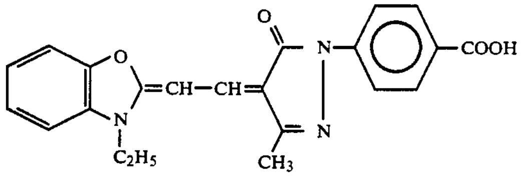
IV-1
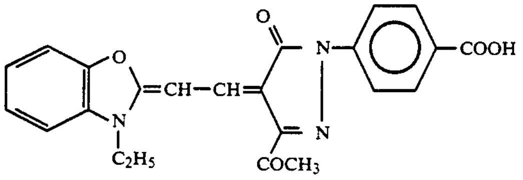
IV-2

-continued
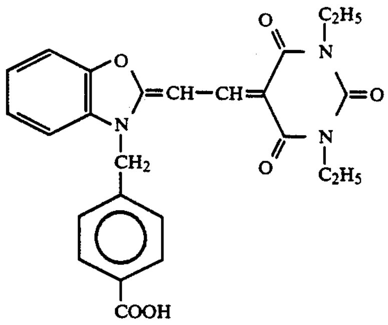
IV-3
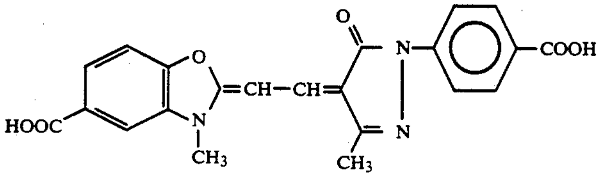
IV-4
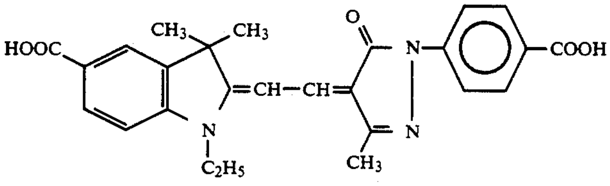
IV-5
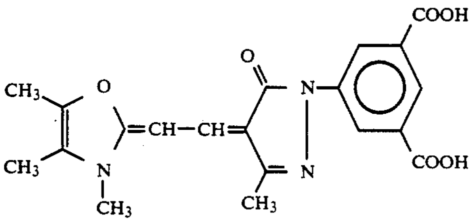
IV-6
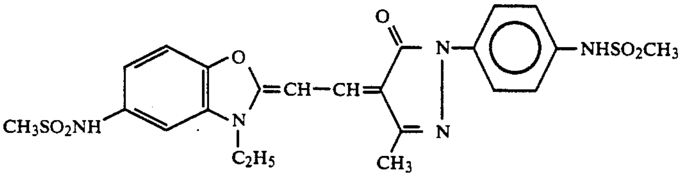
IV-7
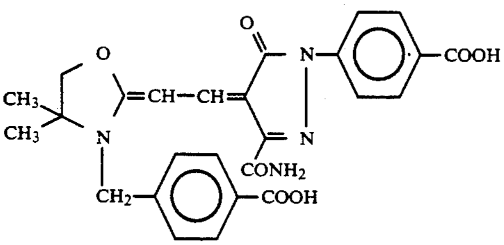
IV-8
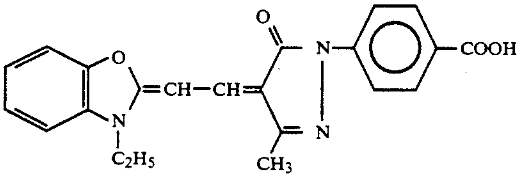
IV-9

-continued
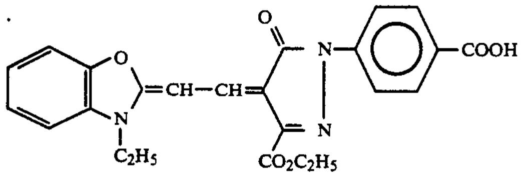
IV-10
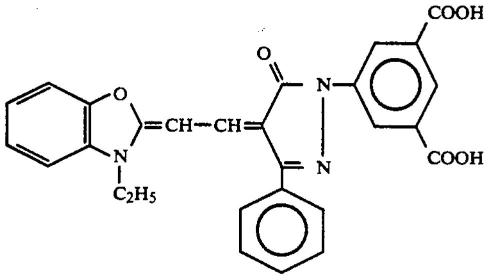
IV-11
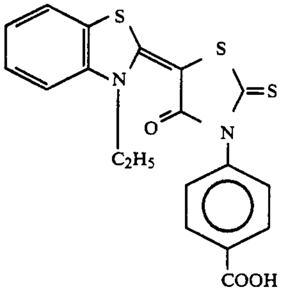
IV-12
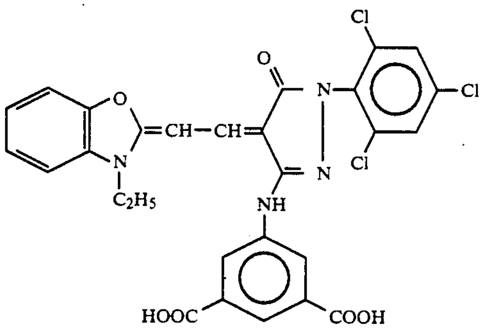
IV-13
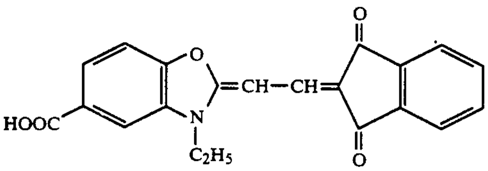
IV-14
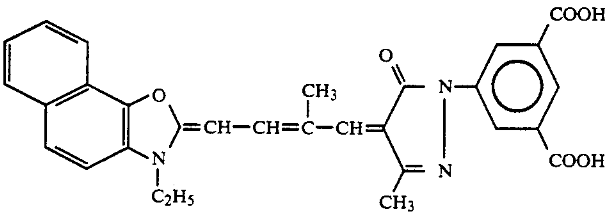
IV-15

-continued
IV-16
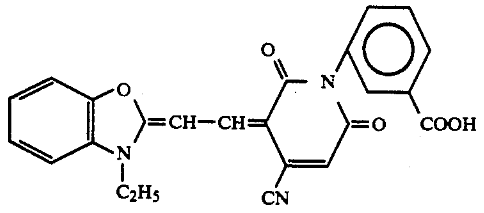
V-1
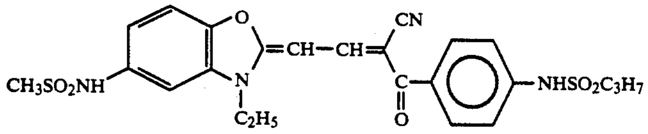
V-2
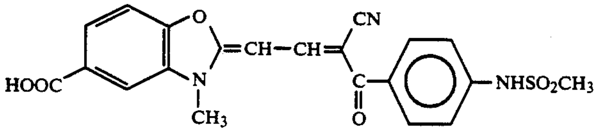
V-3
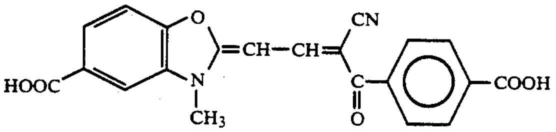
V-4
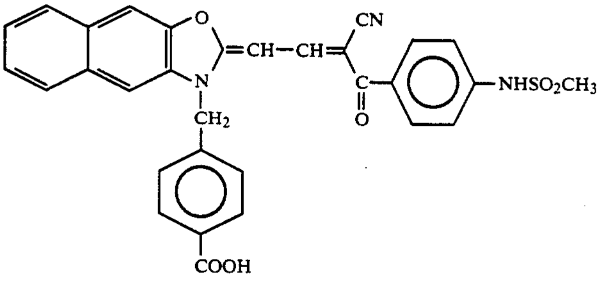
V-5
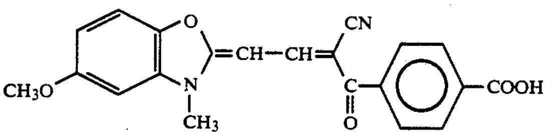
V-6
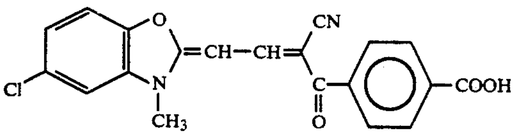
V-7
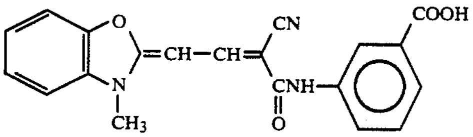

-continued
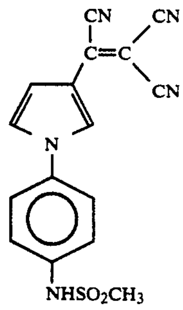
VI-1
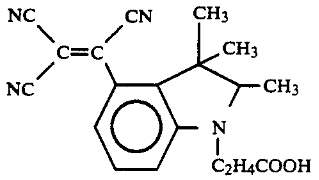
VI-2
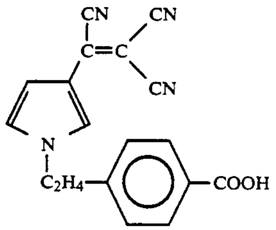
VI-3
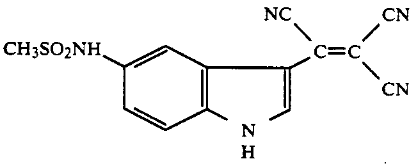
VI-4
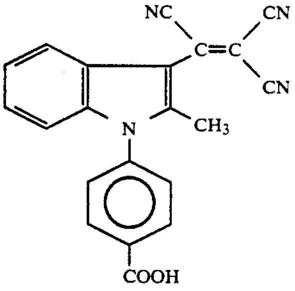
VI-5
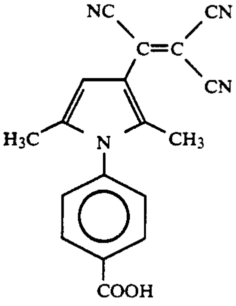
VI-6

-continued
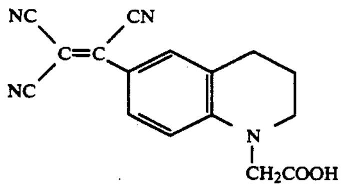
VI-7
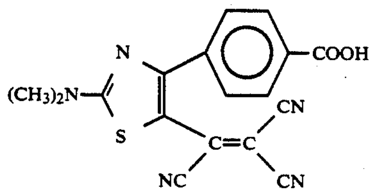
VI-8
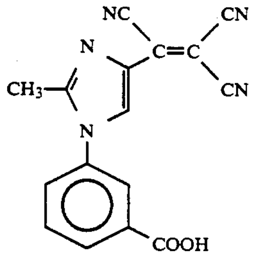
VI-9
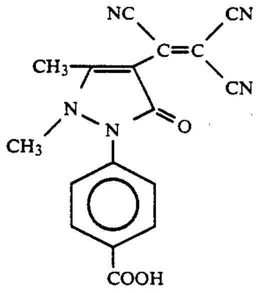
VI-10
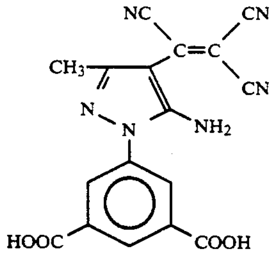
VI-11
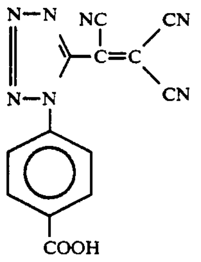
V-12

-continued
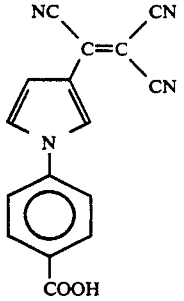
VI-13
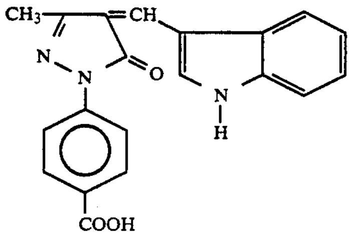
VII-1
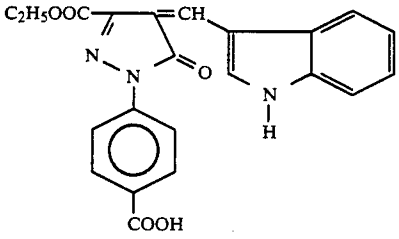
VII-2
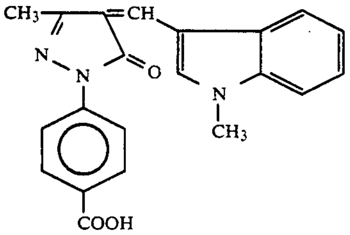
VII-3
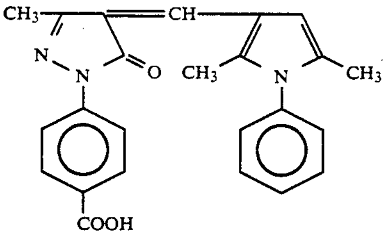
VII-4
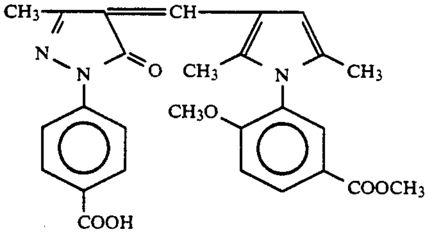
VII-5
Dyes to be used in the present invention are produced easily by or in accordance with any one of the methods described in WO88/04794, EP-A-274723, EP-A-276566 and EP-A-299435, JP-A-52-92716, JP-A-55-155350, JP-A-55-155351, JP-A-61-205934, JP-A-48-68623, U.S. Pat. Nos. 2,527,583, 3,486,897, 3,746,539, 3,933,798, 4,130,429, 4,040,841, Japanese Patent Application No. 1-50874 (corresponding to JP-A-3-7931), JP-A-2-

282244, and Japanese Patent Application No. 1-307363 (corresponding to JP-A-3-167546).

A dye dispersion in the form of fine crystals, as referred to herein, means that the dye could not be in the form of molecules (i.e., in a dissolved state) in the intended color layer since the solubility of the dye itself is insufficient. Consequently, it is contained therein in the form of a solid, wherein the size of the solid is not substantially diffusible in the layer.

For preparing such a dye dispersion, the methods described in WO88/04794, EP-A-276566, and JP-A-63-197943 are referred to. Generally, a dye is powdered with a ball mill and stabilized with a surfactant and a gelatin.

The dye dispersion, as used in the present invention, was prepared in accordance with the method described in JP-A-63-197943.

Precisely, 434 ml of water and 791 ml of a 6.7% aqueous solution of a surfactant, Triton X-200R (TX-200R, product sold from Rohm and Haas), were put in a 2 literball mill. To this solution was added 20 g of a dye. 400 ml of zirconium oxide ($ZrO_2$) beads (2 mm diameter) was added thereto. The content was milled for 4 days.

To the milled content was added 160 g of a 12.5% aqueous gelatin solution. After defoaming, the mixture thus obtained was filtered to remove $ZrO_2$ beads therefrom. Since the product obtained comprised fine grains having a mean grain size of about 0.3 μm, it was then classified by centrifugation to select fine grains having a grain size of 1 μm or less.

The fine solid grains of dye to be used in the present invention are desired to have an average grain size (diameter) of 1.0 μm or less, more preferably 0.5 μm or less.

The amount of dye(s) to be used in the coated subbing layer of the presently claimed invention is preferably from 5 to 300 mg/m$^2$, more preferably from 10 to 150 mg/m$^2$.

The amount of the hydrophilic colloid or gelatin to be used in preparing the subbing composition of the present invention may be such that the coated gelatin amount in the subbing layer is 0.5 g/m$^2$ or less.

The coated gelatin amount in the colored layer to be prepared as above is generally 0.5 g/m$^2$ or less, preferably from 0.05 to 0.3 g/m$^2$.

It is indispensable that the subbing composition of the present invention contains a latex (polymer latex). The latex to be in the subbing composition is one having a glass transition temperature of 35° C. or lower, preferably 5° C. or lower, more preferably −20° C. or lower.

Specific examples of latex usable in the present invention include polyvinyl acetate, polybutyl methacrylate, polymethyl acrylate, polyethyl acrylate, polybutyl acrylate, polybutadiene, polyethylene, methyl methacrylate/ethyl acrylate copolymer, and vinyl acetate-/ethylene copolymer which, however, are not limited.

The amount of the latex to be coated is preferably from 5 to 250 mg/m$^2$, more preferably from 5 to 100 mg/m$^2$.

The proportion of gelatin/latex is preferably within the range of 1/1 to 10/1, respectively.

Where a photographic emulsion layer is coated over the subbing layer-coated article of the present invention, too much of the total hydrophilic colloid coated is undesirable as it causes an increase of the water content used in the film during development, and causes a superfluous load for drying the developed film. Therefore, the amount of the total hydrophilic colloid, to be coated on one surface of the photographic material of the present invention, is desirably 3 g/m$^2$ or less, more preferably 2.8 g/m$^2$.

As silver halides to be used in the light-sensitive silver halide emulsion constituting the photographic material of the present invention, any of silver chlorobromide, silver bromide, silver iodobromide, and silver chloroiodobromide can be used. Preferred is silver iodobromide. The silver iodide content in the silver halide is preferably 30 mol % or less, especially preferably 10 mol % or less. The iodide distribution in the silver iodobromide grains may be either uniform or different between the inside and the surface. The mean grain size of the grains is desirably 0.4 μm or more, more preferably from 0.5 to 2.0 μm. The grain size distribution of the grains may be either broad or narrow.

The silver halide grains in the emulsion may have a regular crystalline form such as a cubic, octahedral, tetradecahedral or rhombic dodecahedral crystalline form, or an irregular crystalline form such as a spherical, tabular or pebble-like crystalline form. They may also have a composite crystalline form. A mixture of grains of various crystalline forms may also be used. Tabular grains having a mean aspect ratio larger than 5/1 are preferred, since they have a larger covering power than regular grains. Using such tabular grains, the amount of silver to be coated may well be reduced. In the present invention, it is desired that 50% by weight or more, more preferably from 70% by weight to 100% by weight, as the total projected area, of the total silver halide emulsion grains in the silver halide emulsion layer are tabular grains having a mean aspect ratio of larger than 5/1. Details of such silver halide emulsions are described in *Research Disclosure* No. 225, Item 22534, pages 20 to 58 (January, 1983) and JP-A-58-127921 and JP-A-58-113926.

The light-sensitive silver halide emulsion constituting the photographic material of the present invention may be composed of two or more different silver halide emulsions. They may be different from one another in grain size, halogen composition and sensitivity. A mixture comprising a light-sensitive emulsion and a substantially light-insensitive emulsion (where surfaces or insides may be either fogged or not fogged) may also be used. The light-sensitive emulsion and the substantially light-insensitive emulsion may be divided into two or more constitutive layers. (Details for making photographic emulsion layers are described in U.S. Pat. Nos. 2,996,382 and 3,397,987, which may be referred to.) For instance, a light-sensitive silver halide emulsion of spherical or pebble-like grains and a light-sensitive silver halide emulsion of tabular grains having a ratio of diameter/thickness of 5 or more may be incorporated into one light-sensitive layer; or they may be provided on a support separately as different layers, like JP-58-127921. In the latter case of providing them on a support separately as different layers, the light-sensitive silver halide emulsion of tabular grains may be nearer to the support or oppositely remoter from the support than the other layer.

Photographic emulsions for use in the present invention can be prepared by known methods, for example, by those described in P. Glafkides, *Chimie et Physique Photographique* (published by Paul Montel, 1967), G. F. Duffin, *Photographic Emulsion Chemistry* (published by the Focal Press, 1966), V. L. Zelikman et al, *Making and Coating Photographic Emulsion* (published by The Focal Press, 1964), and JP-A-58-127921 and JP-A-58-113926. Briefly, they may be prepared by any one of an acid method, a neutral method and an ammonia method. As a system of reacting a soluble silver salt and soluble halide(s), a single jet method, a double jet method or a combination of them can be employed.

A so-called reversed mixing method of forming silver halide grains in the presence of excess silver ions can also be employed. As one system of a double jet method, a so-called controlled double jet method for keeping a constant pAg value of the liquid phase yielding silver halide grains may also be employed. In accordance with this method, a silver halide emulsion comprising silver halide grains having a regular crystalline form and a nearly uniform grain size can be obtained.

Regarding the crystalline structure of silver halide grains constituting the photographic material of the present invention, the grains may have a uniform crystalline structure throughout the grain, or they may have a layered structure in which the inside part and the surface part have different halide compositions, or they may be so-called conversion type ones such as those described in British Patent 635,841 and U.S. Pat. No. 3,622,318. When silver halides are formed, in the step of forming silver halide grains or of physically ripening the formed silver halide grains, a cadmium salt, a zinc salt, a lead salt, a thallium salt, an iridium salt or a complex salt thereof, a rhodium salt or a complex salt thereof, or an iron salt or a complex salt thereof may be incorporated into the reaction system.

Additionally, in forming silver halide grains, a so-called silver halide solvent such as ammonia, thioether compounds, thiazolidine-2-thione, tetra-substituted thioureas, potassium thiocyanate, ammonium thiocyanate or amine compounds can be added to the reaction system so as to control the growth of the grains.

The silver halide emulsions for use in the present invention may be or may not be chemically sensitized. As a means of chemical sensitization of them, any one known in this technical field, such as sulfur sensitization, selenium sensitization, reduction sensitization and gold sensitization, can be employed singly or in combination.

Of noble metal sensitization, gold sensitization is typical, which may apply to the present invention. In gold sensitization, gold compounds, essentially gold complexes, are used. Needless to say, any complexes of noble metals other than gold complexes, such as those of platinum, palladium or iridium, can also be used in gold sensitization. Details of gold sensitization of photograhic silver halide emulsions are described in U.S. Pat. No. 2,448,060 and British Patent 618,061..

As sulfur sensitizing agents to be used in sulfur sensitization, usable are sulfur compounds to be contained in gelatin as well as other various sulfur compounds such as thiosulfates, thioureas, thiazoles and rhodanines.

As reduction sensitizing agents, usable are stannous salts, amines, formamiinesulfinic acids and silane compounds.

Photographic emulsions constituting the photographing material of the present invention can contain various compounds for the purpose of preventing the material from fogging during manufacture, storage, photographic processing, or for the purpose of stabilizing the photographic properties of the material. For instance, various compounds known as an antifoggant or stabilizer can be used, including azoles (for example, benzothiazolium salts, nitroimidazoles, nitrobenzimidazoles, chlorobenzimidazoles, bromobenzimidazoles, nitroindazoles, benzotriazoles, aminotriazoles), mercapto compounds (for example, mercaptothiazoles, mercaptobenzothiazoles, mercaptobenzimidazoles, mercaptothiadiazoles, mercaptotetrazoles (especially, 1-phenyl-5-mercaptotetrazole), mercaptopyrimidines, mercaptotriazines), thioketo compounds (for example, oxadolinethione), azaindenes (for example, triazaindenes, tetrazaindenes (especially, 4-hydroxy-substituted (1,3,3a,7)tetrazaindenes), pentazaindenes), and benzenethiosulfonic acids, benzenesulfinic acids, and benzenesulfonic acid amides.

Especially preferred are nitron and its derivatives described in JP-A-60-76743 and JP-A-60-87322; mercapto compounds described in JP-A-60-80839; and heterocyclic compounds and silver complexes of heterocyclic compounds (e.g., 1-phenyl-5-mercaptotetrazole silver) described in JP-A-57-164735.

The light-sensitive silver halide emulsions for use in the present invention can be color-sensitized with sensitizing dyes to be sensitive to blue light, green light, red light or infrared light having a relatively long wavelength. As sensitizing dyes for this purpose, usable are cyanine dyes, merocyanine dyes, complex cyanine dyes, complex merocyanine dyes, holopolar cyanine dyes, styryl dyes, hemicyanine dyes, oxonole dyes and hemioxonole dyes.

Sensitizing dyes may be added to silver halide emulsions at any step of the process of manufacturing emulsions, or they may also be added to emulsions at any stage after manufacture of them and just before coating of them. As examples of the former, sensitizing dyes are added to silver halide grains in the step of forming them or in the step of physically ripening or chemically ripening the formed silver halide grains.

The photographic emulsion layer and other hydrophilic colloid layers constituting the photographic material of the present invention can contain various surfactants as a coating aid or for other various purposes such as: prevention of static charges; improvement of slide property; improvement of emulsification and dispersion; and, prevention of surface blocking and improvement of photographic properties (for example, for acceleration of developability, elevation of hard contrast and elevation of sensitivity).

Usable for these purposes are, for example, saponins (steroid saponins); nonionic surfactants such as alkylene oxide derivatives (e.g., polyethylene glycol, polyethylene glycol/polypropylene glycol condensates, polyethylene glycol alkyl ethers, polyethylene glycol alkylaryl ethers, silicone-polyethylene oxide adducts), and alkyl esters of saccharides; anionic surfactants such as alkylsulfonic acid salts, alkylbenzenesulfonic acid salts, alkylnaphthalenesulfonic acid salts, alkyl sulfate esters, N-acyl-N-alkyltaurins, sulfosuccinate esters, and sulfoalkyl-polyoxyethylene alkylphenyl ethers; amphoteric surfactants such as alkylbetaines, and alkylsulfobetaines; and cationic surfactants such as aliphatic or aromatic quaternary ammonium salts, pyridinium salts, and imidazolium salts. Among them, especially preferred are saponin; anionic surfactants such as sodium dodecylbenzenesulfonate, sodium di-2-ethylhexyl-α-sulfosuccinate, sodium p-octylphenoxyethoxyethoxyethanesulfonate, sodium dodecyl sulfate, sodium triisopropylnaphthalenesulfonate, and sodium N-methyl-oleoyltaurin; cationic surfactants such as dodecyltrimethylammonium chloride, N-oleoyl-N',N',N'-trimethylammonio-diaminopropane bromide, and dodecyl-pyridinium chloride; betaines such as N-dodecyl-N,N-dimethylcarboxybetaine, and N-oleyl-N,N-dimethylsulfobutylbetaine; and nonionic surfactants such as poly(mean polymerization degree, n=10)oxyethylene cetyl ether, poly(n=25)oxyethylene p-nonylphenyl ether, and bis(1-poly(n=15)oxyethylene-oxy-2,4-di-t-pentylphenyl)ethane.

As preferred antistatic agents, there are mentioned fluorine-containing surfactants such as potassium perfluorooctanesulfonate, sodium N-propyl-N-perfluorooctanesulfonylglycine, sodium N-propyl-N-perfluorooctanesulfonylaminoethyloxy-poly(n=3)oxyethylene butanesulfonate, N-perfluorooctanesulfonyl-N',N',N'-trimethylammonio-diaminopropane chloride, and N-perfluorodecanoylaminopropyl-N',N'-dimethyl-N'-carboxybetaine; nonionic surfactants such as those described in JP-A-60-80848, JP-A-61-112144, JP-A-62-172343 and JP-A-62-173459; and alkali metal nitrates, electroconductive tin oxide, zinc oxide and vanadium pentaoxide, and antimony-doped composite oxides of them.

The photographic material of the present invention can contain, as a mat agent, fine grains of organic compounds such as polymethyl methacrylate homopolymer, methyl methacrylate-methacrylic acid copolymer or starch, or of inorganic compounds of silica or titanium dioxide. The grain size of the fine grains is preferably from 1.0 to 10 μm, especially preferably from 2 to 5 μm.

The surface layer of the photographic material of the present invention can contain, as a lubricant, silicone compounds such as those described in U.S. Pat. Nos. 3,489,576 and 4,047,958; colloidal silica such as that described in JP-B-56-23139; as well as paraffin wax, higher fatty acid esters, and starch derivatives.

The hydrophilic colloid layers constituting the photographic material of the present invention can contain, as a plasticizer, polyols such as trimethylopropane, pentanediol, butanediol, ethylene glycol or glycerin. In addition, they may also contain a polymer latex for the purpose of improving the pressure resistance, preferably. As preferred polymers to be used for this purpose, there are mentioned, for example, homopolymers of alkyl acrylates, copolymers of alkyl acrylates and acrylic acid, styrene-butadiene copolymers, and polymers or copolymers composed of monomers having an active methylene group.

The photographic emulsion and light-insensitive hydrophilic colloid layers constituting the photographic material of the present invention can contain an inorganic or organic hardening agent. For instance, usable as such a hardening agent are chromium salts, aldehydes (e.g., formaldehyde, glutaraldehyde), N-methylol compounds (e.g., dimethylolurea), active vinyl compounds (e.g., 1,3,5-triacryloyl-hexahydro-s-triazine, bis(vinylsulfonyl)methyl ether, N,N'-methylene-bis[β-(vinylsulfonyl)propionamide]), active halogenated compounds (e.g., 2,4-dichloro-6-hydroxy-s-triazine), mucohalogenic acid (e.g., mucochloric acid), N-carbamoylpyridinium salts (e.g., (1-morpholinocarbonyl-3-pyridinio)methanesulfonate), and haloamidinium salts (e.g., 1-(1-chloro-1-pyridinomethylene)pyrrolidinium 2-naphthalenesulfonate). They can be used either singly or in combination. Above all, active vinyl compounds described in JP-B-53-41220, JP-B-53-57257, JP-B-59-162546 and JP-B-60-80846 and active halogenated compounds described in U.S. Pat. No. 3,325,287 are preferred.

Where the photographic material of the present invention is used as an X-ray photographic material, the hydrophilic colloid layer is desired to be hardened with any one of the above-mentioned hardening agents in such a way that the hardened layer is to have a water swellability of 300% or less, especially preferably 250% or less.

As binders or protective colloids which may be in the emulsion layers and interlayers constituting the photographic material of the present invention, gelatin is advantageously used. As a matter of course, any hydrophilic colloids other than gelatin may also be used.

For instance, usable are various synthetic hydrophilic high molecular substances of homopolymers or copolymers such as dextran, polyvinyl alcohol, polyvinyl alcohol partial acetal, poly-N-vinylpyrrolidone, polyacrylic acid, polyacrylamide, and polyvinylimidazole.

As gelatin, usable are a lime-processed gelatin, an acid-processed gelatin and an enzyme-processed gelatin. A gelatin hydrolysate is also usable.

Above all, combination of gelatin with dextran and polyacrylamide is preferred.

Preferably, the photographic material of the present invention is a silver halide photographic material forming a black-and-white image, in which the silver amount coated is 5 $g/m^2$ or less, especially preferably from 1 $g/m^2$ to 3 $g/m^2$.

For photographic processing of the photographic material of the present invention, any known black-and-white processing method and any known black-and-white processing solution, such as those described in *Research Disclosure* No. 176, Item 17643 (RD-17643), pages 28 to 30, can be employed. The processing temperature may be selected from the range of 18° C. to 50° C. As the case may be, a lower temperature than 18° C. or a higher temperature than 50° C. may also be employed. Preferably, processing with an automatic developing machine at a temperature from 20° C. to 40° C. applies to the photographic material of the present invention. In this case, the processing time (from introduction of a photographic material into a processing machine to taking out of the processed and dried material therefrom) is desirably from 10 seconds to 3 minutes and 30 seconds, especially preferably from 15 seconds to 90 seconds, most preferably from 15 seconds to 45 seconds.

The developer to be used for black-and-white processing of the photographic material of the present invention can contain any known developing agent. For instance, usable as developing agents are dihydroxybenzenes (e.g., hydroquinone), 3-pyrazolidones (e.g., 1-phenyl-3-pyrazolidone), and aminophenols (e.g., N-methylp-aminophenol). They may be used singly or in combination. The developer generally contains, in addition to the developing agent, other known additives such as a preservative, alkaline agent, pH buffer and antifoggant. If desired, it may also contain further additives such as a solvent aid, toning agent, development accelerator (e.g., quaternary salts, hydrazine, benzyl alcohol), development inhibitor (e.g., iodides, bromides, mercapto compounds, triazoles), surfactant, defoaming agent, water softener, hardening agent (e.g., glutaraldehyde), and tackifier.

As one special system of development, a developing agent may be incorporated into the photographic material of the present invention, for example, into the emulsion layer thereof; and, the material may be processed with an aqueous alkaline solution for developing it. In this system, hydrophobic developing agents can be incorporated into emulsion layers by various methods such as those described in *Research Disclosure* No. 169, Item 16928 (RD-16928), U.S. Pat. No. 2,739,890, British Patent 813,253 and German Patent 1,547,763. Development of this type can be combined with silver salt stabilization with thiocyanates.

As a fixing solution to be applied to the photographic material of the present invention, any known fixing agent can be used. For instance, usable are organic sulfur compounds known to have an effect as a fixing agent. The fixing solution can contain a water-soluble aluminium salt as a hardening agent.

Use of compounds capable of releasing a development inhibitor during development, such as those described in JP-A-61-230135 and JP-A-63-25653, are also preferred so as to augment the effect of the present invention.

Next, the present invention will be explained in more detail by way of the following examples, which, however, are not intended to restrict the scope of the present invention.

EXAMPLE 1

Formation of Support 1:

Formation of Subbing Layer-Coated Sheets 1 to 30:

A biaxially stretched blue-colored polyethylene terephthalate film(*) having a thickness of 175 μm was surface-treated by corona-discharging, and both surfaces of the film were coated with a latex liquid composed of the following components with a wire bar coater and then dried at 175° C. for one minute, the amount of the components to be coated on one surface being shown below.

(*) The polyethylene terephthalate film contained 1,4-bis(2,6-diethylanilinoanthraquinone).

| | |
|---|---|
| Butadiene-Styrene Copolymer Latex (butadiene/styrene = 31/69, by weight) | 0.322 g/m² |
| 2,4-Dichloro-6-hydroxy-s-triazine Sodium Salt | 4.2 mg/m² |

The latex liquid contained compound (a) as an emulsifying and dispersing agent, in an amount of 0.4% by weight, to the solid content.

Compound (a):

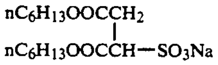

Next, a composition composed of the following components was coated on both surfaces of the film with a wire bar coater and then dried at 150° C. for one minute, the amount to be coated being shown below.

| | |
|---|---|
| Gelatin | 80 mg/m² |
| Dye | Table 1, Table 2 |
| Latex | Table 1, Table 2 |
| 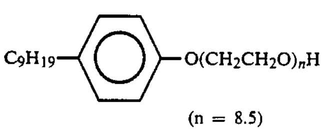 (n = 8.5) | 8 mg/m² |

-continued

| | |
|---|---|
| 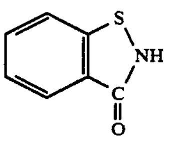 | 0.27 mg/m² |

Formation of Subbing Layer-Coated Sheets 31 to 40:

Subbing layer-coated sheets 31 to 40 were formed in the same manner as in formation of subbing layer-coated sheets 6 to 15, except that the amount of dye III-3 was 0 mg/m² (that is, dye III-3 was not coated).

Preparation of Emulsion Coating Liquid:

5 g of potassium bromide, 0.05 g of potassium iodide, 30 g of gelatin and 2.5 cc of 5% aqueous solution of thioether $HO(CH_2)_2S(CH_2)_2S(CH_2)_2OH$ were dissolved in one liter of water. The resulting solution was kept at 73° C., to which were added an aqueous solution of 8.33 g of silver nitrate and an aqueous solution containing 5.94 g of potassium bromide and 0.726 g of potassium iodide with stirring by a double jet method over a period of 45 seconds. Subsequently, 2.5 g of potassium bromide was added thereto, and an aqueous solution containing 8.33 g of silver nitrate was added thereto over a period of 7 minutes and 30 seconds; whereupon, the flow rate at the finish of the addition was 2 times that at the start of the same. Subsequently, an aqueous solution containing 153.34 g of silver nitrate and a mixed aqueous solution of potassium bromide and potassium iodide were added thereto with the pAg potential of 8.1 being controlled by a controlled double jet method over a period of 25 minutes; whereupon the flow rate at the finish of the addition was accelerated to be 8 times that at the start of the same. After addition of the solutions, 15 cc of 2 N potassium thiocyanate solution was added thereto and 50 cc of aqueous 1% potassium iodide solution was then added thereto over a period of 30 seconds. Afterwards, the temperature of the reaction system was lowered to 35° C. and soluble salts were removed by flocculation. Then, the temperature was elevated up to 40° C., and 68 g of gelatin, 2 g of phenol and 7.5 g of trimethylolpropane were added to the reaction system, which was then adjusted to have ph of 6.55 and pAg of 8.10 with sodium hydroxide and potassium bromide.

After the temperature was further elevated up to 56° C, 175 mg of 4-hydroxy-6-methyl-1,3,3a,7-tetrazaindene and 625 mg of sensitizing dye (1) having the following structural formula were added. 10 minutes after the addition, 5.5 mg of sodium thiocyanate 5-hydrate, 163 mg of potassium thiocyanate and 3.6 mg of chloroauric acid were added to the reaction system, which was then rapidly cooled and solidified in 5 minutes. The emulsion thus obtained contained tabular grains having a mean aspect ratio of 5 or more in a proportion of 80% of the total projected area of all the grains therein.

Sensitizing Dye (1):

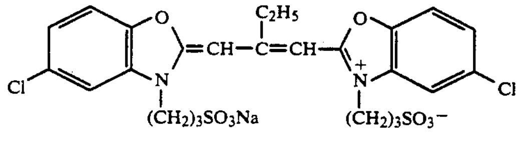

To the emulsion were added the following chemicals of the indicated amounts per mol of silver halide, to obtain a coating liquid.

| | |
|---|---|
| 2,6-Bis(hydroxyamino)-4-diethylamino-1,3,5-triazine | 80 mg |
| Sodium Polyacrylate (mean molecular weight: 41,000) | 4.0 g |
| 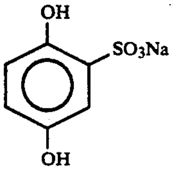 | 9.7 g |
| Copolymer Plasticizer of Ethyl Acrylate/Acrylic Acid/Methacrylic Acid (95/2/3) | 20.0 g |
| Nitron | 50 mg |
| 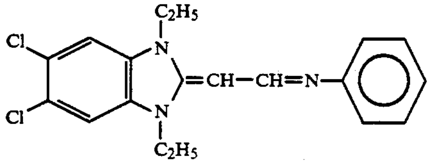 | 5.0 mg |

Formation of Photographic Material Samples 1 to 51:

The above-mentioned coating liquid for forming an emulsion layer was uniformly coated on both surfaces of each of the previously prepared subbing layer-coated sheets to prepare photographic material samples 1 to 51. The amounts of the components of the emulsion layer coated on one surface are mentioned below. Over the emulsion layer coated, a protective layer comprising the components mentioned below was coated, the amount of the components to be coated on one surface being shown below.

| | |
|---|---|
| Emulsion Layer: | |
| Silver | 1.9 g/m$^2$ |
| Gelatin | 1.2 g/m$^2$ |
| Surface Protective Layer: | |
| Gelatin | Table 3, Table 4 |
| Dextran (mean molecular weight: 39,000) | 0.61 g/m$^2$ |
| Sodium Polyacrylate (mean molecular weight 41,000) | 70 mg/m$^2$ |
| Hardening Agent, 1,2-Bis-(sulfonylacetamido)ethane | 56 mg/m$^2$ |
| Mat Agent, Copolymer of Polymethyl Methacrylate/Methacrylic Acid (9/1) (mean grain size 3.5 μm) | 0.06 g/m$^2$ |
| 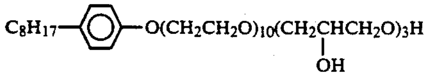 | 60 mg/m$^2$ |
| 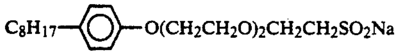 | 20 mg/m$^2$ |
| 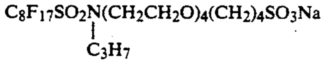 | 2 mg/m$^2$ |
| 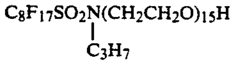 | 5 mg/m$^2$ |

-continued

| | |
|---|---|
| 4-Hydroxy-6-methyl-1,3,3a,7-tetrazaindene | 15.5 mg/m$^2$ |

Evaluation of Scratch-Resistance:

A subbing layer-coated sheet sample was heated up to 120° C., and it was rubbed five times with a white paper of 2 cm×2 cm with a weight of 3 kg thereover. The number of scratches formed per cm was counted and shown in Table 1 below.

Evaluation of Photographic Property:

For exposure, HR-4 Screen (by Fuji Photo Film Co.) was used. Briefly, in accordance with an ordinary method, a photographic material sample was air tightly placed between two sheets of HR-4 Screen, and was exposed to an X-ray through a water-phantom of 10 cm. The exposed sample was then processed in accordance with the following procedure.

| | |
|---|---|
| Development | 35° C. × 6.3 sec |
| Fixation | 31° C. × 6.7 sec |
| Rinsing | 15° C. × 4 sec |
| Squeezing | 4 sec |
| Drying | 60° C. × 8 sec |
| Dry-to-Dry Processing Time | 29 sec |

The developer and fixing solution used in the process each had the following composition.

| | |
|---|---|
| Developer: | |
| Potassium Hydroxide | 29 g |
| Potassium Sulfite | 44.2 g |
| Sodium Hydrogencarbonate | 7.5 g |
| Boric Acid | 1.0 g |
| Diethylene Glycol | 12 g |
| Ethylenediaminetetraacetic Acid | 1.7 g |
| 5-Methylbenzotriazole | 0.06 g |
| Hydroquinone | 25 g |
| Glacial Acetic Acid | 18 g |
| Triethylene Glycol | 12 g |
| 5-Nitroindazole | 0.25 g |
| 1-Phenyl-3-pyrazolidone | 2.8 g |
| Glutaraldehyde (50 wt/wt %) | 9.86 g |
| Sodium Metabisulfite | 12.6 g |
| Potassium Bromide | 3.7 g |
| Water to make | 1.0 liter |
| Fixing Solution: | |
| Ammonium thiosulfate (70 wt/vol %) | 200 ml |
| Disodium Ethylenediamine-tetraacetate Dihydrate | 0.02 g |
| Potassium Sulfite | 15 g |
| Boric Acid | 10 g |
| Sodium Hydroxide | 6.7 g |
| Glacial Acetic Acid | 15 g |
| Aluminium Sulfate | 10 g |
| Sulfuric Acid (36 N) | 3.9 g |
| Water to make | 1 liter |
| pH | 4.25 |

Measurement of Sharpness (MTF):

MTF of each sample was measured by combination of the above-mentioned HR-4 Screen and automatic developing machine. Briefly, using an aperture of 30 μm×500 μm, the area having an optical density of 1.0 was measured to obtain an MTF value for a space frequency of 1.0 cycle/mm.

Evaluation of Drying Property:

A film sample was cut into a size of 24.5 cm×30.5 cm and was processed with an automatic developing machine, whereupon the processed film just taken out from the drying zone was touched by the hand to examine the dried state of the film. Evaluation was effected on the basis of the following criteria.

◎: Sufficiently dried.

○: Dried

X: The processed film was wet and was not dried sufficiently.

Evaluation of Residual Color:

Dmin of the processed sample was observed, and the residual color thereof was evaluated on the basis of the following criteria.

Evaluation of Time-Dependent Stability of Photographic Material Samples:

Photographic material samples 11 to 20 and 51 were stored under the condition of 50° C. and 68% RH or 25° C. and 55% RH for 5 days and then processed in the same manner as above. Dmin of each of the processed samples was measured and shown in Table 7 below.

As is obvious from the results in Table 1 and Table 2, the subbing layer coated PET samples of the present invention had excellent scratch resistance.

TABLE 1

| Subbing Layer-Coated Sheet Sample | Amount of Dye III-3 Coated | Latex | | | Scratch-Resistance (number of scratches) |
|---|---|---|---|---|---|
| | | Polymer | Tg | Amount Coated | |
| 1 (Comparative Sample) | 15 mg/m$^2$ | — | — | — | 61 |
| 2 (Comparative Sample) | " | Polystrene | 105° C. | 20 mg/m$^2$ | 59 |
| 3 (Comparative Sample) | " | " | " | 40 mg/m$^2$ | 57 |
| 4 (Comparative Sample) | " | Polyvinyl Chloride | 82° C. | 20 | 60 |
| 5 (Comparative Sample) | " | " | " | 40 mg/m$^2$ | 58 |
| 6 (Sample of the Invention) | " | Polyvinyl Acetate | 30° C. | 20 mg/m$^2$ | 35 |
| 7 (Sample of the Invention) | " | " | " | 40 mg/m$^2$ | 27 |
| 8 (Sample of the Invention) | " | Polymethyl Acrylate | 3° C. | 20 mg/m$^2$ | 28 |
| 9 (Sample of the Invention) | " | " | " | 40 mg/m$^2$ | 25 |
| 10 (Sample of the Invention) | " | Polyethyl Acrylate | −22° C. | 20 mg/m$^2$ | 26 |
| 11 (Sample of the Invention) | " | " | " | 40 mg/m$^2$ | 20 |
| 12 (Sample of the Invention) | " | Polybutyl Acrylate | −52° C. | 20 mg/m$^2$ | 23 |
| 13 (Sample of the Invention) | " | " | " | 40 mg/m$^2$ | 17 |
| 14 (Sample of the Invention) | " | Polybutadiene | −85° C. | 20 mg/m$^2$ | 20 |
| 15 (Sample of the Invention) | " | " | " | 40 mg/m$^2$ | 15 |

TABLE 2

| Subbing Layer-Coated Sheet Sample | Amount of Dye III-29 Coated | Latex | | | Scratch-Resistance (number of scratches) |
|---|---|---|---|---|---|
| | | Polymer | Tg | Amount Coated | |
| 16 (Comparative Sample) | 13 mg/m$^2$ | — | — | — | 63 |
| 17 (Comparative Sample) | " | Polystyrene | 105° C. | 20 mg/m$^2$ | 57 |
| 18 (Comparative Sample) | " | " | " | 40 mg/m$^2$ | 58 |
| 19 (Comparative Sample) | " | Polyvinyl Chloride | 82° C. | 20 mg/m$^2$ | 61 |
| 20 (Comparative Sample) | " | " | " | 40 mg/m$^2$ | 59 |
| 21 (Sample of the Invention) | " | Polyvinyl Acetate | 30° C. | 20 mg/m$^2$ | 36 |
| 22 (Sample of the Invention) | " | " | " | 40 mg/m$^2$ | 26 |
| 23 (Sample of the Invention) | " | Polymethyl Acrylate | 3° C. | 20 mg/m$^2$ | 29 |
| 24 (Sample of the Invention) | " | " | " | 40 mg/m$^2$ | 24 |
| 25 (Sample of the Invention) | " | Polyethyl Acrylate | −22° C. | 20 mg/m$^2$ | 27 |
| 26 (Sample of the Invention) | " | " | " | 40 mg/m$^2$ | 21 |
| 27 (Sample of the Invention) | " | Polybutyl Acrylate | −52° C. | 20 mg/m$^2$ | 22 |
| 28 (Sample of the Invention) | " | " | " | 40 mg/m$^2$ | 18 |
| 29 (Sample of the Invention) | " | Polybutadiene | −85° C. | 20 mg/m$^2$ | 21 |
| 30 (Sample of the Invention) | " | " | " | 40 mg/m$^2$ | 16 |

○: No problem for practical use.

Δ: Some problem for practical use.

X: Practically unusable.

As is obvious from the results in Table 3 and Table 4, the silver halide photographic material samples of the present invention had excellent drying property and had little residual color.

TABLE 3

| Photographic Material Sample | Subbing Layer-Coated Sheet | Gelatin in Surface Protective Layer | Total Amount of Hydrophilic Colloid | Drying Property | Residual Color |
|---|---|---|---|---|---|
| 1 (Comparative Sample) | 6 | 1.5 g/m$^2$ | 3.31 g/m$^2$ | X | Δ |
| 2 (Comparative Sample) | 7 | " | " | X | Δ |
| 3 (Comparative Sample) | 8 | " | " | X | Δ |
| 4 (Comparative Sample) | 9 | " | " | X | Δ |
| 5 (Comparative Sample) | 10 | " | " | X | Δ |
| 6 (Comparative Sample) | 11 | " | " | X | Δ |
| 7 (Comparative Sample) | 12 | " | " | X | Δ |
| 8 (Comparative Sample) | 13 | " | " | X | Δ |
| 9 (Comparative Sample) | 14 | " | " | X | Δ |
| 10 (Comparative Sample) | 15 | " | " | X | Δ |
| 11 (Sample of the Invention) | 6 | 0.61 g/m$^2$ | 2.42 g/m$^2$ | ◎ | ○ |
| 12 (Sample of the Invention) | 7 | " | " | ○ | ○ |
| 13 (Sample of the Invention) | 8 | " | " | ◎ | ○ |
| 14 (Sample of the Invention) | 9 | " | " | ○ | ○ |
| 15 (Sample of the Invention) | 10 | 0.61 g/m$^2$ | 2.42 g/m$^2$ | ◎ | ○ |
| 16 (Sample of the Invention) | 11 | " | " | ○ | ○ |
| 17 (Sample of the Invention) | 12 | " | " | ◎ | ○ |

TABLE 3-continued

| Photographic Material Sample | Subbing Layer-Coated Sheet | Gelatin in Surface Protective Layer | Total Amount of Hydrophilic Colloid | Drying Property | Residual Color |
|---|---|---|---|---|---|
| 18 (Sample of the Invention) | 13 | " | " | ○ | ○ |
| 19 (Sample of the Invention) | 14 | " | " | ◎ | ○ |
| 20 (Sample of the Invention) | 15 | " | " | ○ | ○ |

TABLE 4

| Photographic Material Sample | Subbing Layer-Coated Sheet | Gelatin in Surface Protective Layer | Total Amount of Hydrophilic Colloid | Drying Property | Residual Color |
|---|---|---|---|---|---|
| 21 (Comparative Sample) | 21 | 1.5 $g/m^2$ | 3.31 $g/m^2$ | X | Δ |
| 22 (Comparative Sample) | 22 | " | " | X | Δ |
| 23 (Comparative Sample) | 23 | " | " | X | Δ |
| 24 (Comparative Sample) | 24 | " | " | X | Δ |
| 25 (Comparative Sample) | 25 | " | " | X | Δ |
| 26 (Comparative Sample) | 26 | " | " | X | Δ |
| 27 (Comparative Sample) | 27 | " | " | X | Δ |
| 28 (Comparative Sample) | 28 | " | " | X | Δ |
| 29 (Comparative Sample) | 29 | " | " | X | Δ |
| 30 (Comparative Sample) | 30 | " | " | X | Δ |
| 31 (Sample of the Invention) | 21 | 0.61 $g/m^2$ | 2.42 $g/m^2$ | ◎ | ○ |
| 32 (Sample of the Invention) | 22 | " | " | ○ | ○ |
| 33 (Sample of the Invention) | 23 | " | " | ◎ | ○ |
| 34 (Sample of the Invention) | 24 | " | " | ○ | ○ |
| 35 (Sample of the Invention) | 25 | 0.61 $g/m^2$ | 2.42 $g/m^2$ | ◎ | ○ |
| 36 (Sample of the Invention) | 26 | " | " | ○ | ○ |
| 37 (Sample of the Invention) | 27 | " | " | ◎ | ○ |
| 38 (Sample of the Invention) | 28 | " | " | ○ | ○ |
| 39 (Sample of the Invention) | 29 | " | " | ◎ | ○ |
| 40 (Sample of the Invention) | 30 | " | " | ○ | ○ |

As is obvious from the results in Table 5 and Table 6, the silver halide photographic material samples of the present invention gave images of excellent image quality.

TABLE 5

| Photographic | Subbing Layer- | Amount of Dye | Latex | | |
|---|---|---|---|---|---|
| Material Sample | Coated Sheet | III-3 Coated | Polymer | Amount Coated | MTF |
| 41 (Comparative Sample) | 31 | 0 $mg/m^2$ | Polyvinyl Acetate | 20 $mg/m^2$ | 0.52 |
| 42 (Comparative Sample) | 32 | " | " | 40 $mg/m^2$ | 0.51 |
| 43 (Comparative Sample) | 33 | " | Polymethyl Acrylate | 20 $mg/m^2$ | 0.52 |
| 44 (Comparative Sample) | 34 | " | " | 40 $mg/m^2$ | 0.53 |
| 45 (Comparative Sample) | 35 | " | Polyethyl Acrylate | 20 $mg/m^2$ | 0.51 |
| 46 (Comparative Sample) | 36 | " | " | 40 $mg/m^2$ | 0.51 |
| 47 (Comparative Sample) | 37 | " | Polybutyl Acrylate | 20 $mg/m^2$ | 0.53 |
| 48 (Comparative Sample) | 38 | " | " | 40 $mg/m^2$ | 0.52 |
| 49 (Comparative Sample) | 39 | " | Polybutadiene | 20 $mg/m^2$ | 0.52 |
| 50 (Comparative Sample) | 40 | " | " | 40 $mg/m^2$ | 0.51 |
| 51 (Comparative Sample) | 1 | 15 $mg/m^2$ | — | 0 $mg/m^2$ | 0.65 |
| 11 (Sample of the Invention) | 6 | 15 $mg/m^2$ | Polyvinyl Acetate | 20 $mg/m^2$ | 0.65 |
| 12 (Sample of the Invention) | 7 | " | " | 40 $mg/m^2$ | 0.66 |
| 13 (Sample of the Invention) | 8 | " | Polymethyl Acrylate | 20 $mg/m^2$ | 0.64 |
| 14 (Sample of the Invention) | 9 | 15 $mg/m^2$ | Polymethyl Acrylate | 40 $mg/m^2$ | 0.65 |
| 15 (Sample of the Invention) | 10 | " | Polyethyl Acrylate | 20 $mg/m^2$ | 0.64 |
| 16 (Sample of the Invention) | 11 | " | " | 40 $mg/m^2$ | 0.65 |
| 17 (Sample of the Invention) | 12 | " | Polybutyl Acrylate | 20 $mg/m^2$ | 0.65 |
| 18 (Sample of the Invention) | 13 | " | " | 40 $mg/m^2$ | 0.64 |
| 19 (Sample of the Invention) | 14 | " | Polybutadiene | 20 $mg/m^2$ | 0.66 |
| 20 (Sample of the Invention) | 15 | " | " | 40 $mg/m^2$ | 0.65 |

TABLE 6

| Photographic | Subbing Layer- | Amount of Dye | Latex | | |
|---|---|---|---|---|---|
| Material Sample | Coated Sheet | I-29 Coated | Polymer | Amount Coated | MTF |
| 41 (Comparative Sample) | 31 | 0 $mg/m^2$ | Polyvinyl Acetate | 20 $mg/m^2$ | 0.51 |
| 42 (Comparative Sample) | 32 | " | " | 40 $mg/m^2$ | 0.52 |
| 43 (Comparative Sample) | 33 | " | Polymethyl Acrylate | 20 $mg/m^2$ | 0.53 |
| 44 (Comparative Sample) | 34 | " | " | 40 $mg/m^2$ | 0.53 |
| 45 (Comparative Sample) | 35 | " | Polyethyl Acrylate | 20 $mg/m^2$ | 0.52 |
| 46 (Comparative Sample) | 36 | " | " | 40 $mg/m^2$ | 0.51 |
| 47 (Comparative Sample) | 37 | " | Polybutyl Acrylate | 20 $mg/m^2$ | 0.52 |
| 48 (Comparative Sample) | 38 | " | " | 40 $mg/m^2$ | 0.51 |
| 49 (Comparative Sample) | 39 | " | Polybutadiene | 20 $mg/m^2$ | 0.52 |
| 50 (Comparative Sample) | 40 | " | " | 40 $mg/m^2$ | 0.51 |
| 31 (Sample of the Invention) | 21 | 13 $gm/m^2$ | Polyvinyl Acetate | 20 $mg/m^2$ | 0.66 |

TABLE 6-continued

| Photographic Material Sample | Subbing Layer-Coated Sheet | Amount of Dye I-29 Coated | Latex Polymer | Latex Amount Coated | MTF |
|---|---|---|---|---|---|
| 32 (Sample of the Invention) | 22 | " | " | 40 mg/m$^2$ | 0.65 |
| 33 (Sample of the Invention) | 23 | " | Polymethyl Acrylate | 20 mg/m$^2$ | 0.65 |
| 34 (Sample of the Invention) | 24 | 13 mg/m$^2$ | Polymethyl Acrylate | 40 mg/m$^2$ | 0.65 |
| 35 (Sample of the Invention) | 25 | " | Polyethyl Acrylate | 20 mg/m$^2$ | 0.64 |
| 36 (Sample of the Invention) | 26 | " | " | 20 mg/m$^2$ | 0.65 |
| 37 (Sample of the Invention) | 27 | " | Polybutyl Acrylate | 20 mg/m$^2$ | 0.66 |
| 38 (Sample of the Invention) | 28 | " | " | 40 mg/m$^2$ | 0.65 |
| 39 (Sample of the Invention) | 29 | " | Polybutadiene | 20 mg/m$^2$ | 0.64 |
| 40 (Sample of the Invention) | 30 | " | " | 40 mg/m$^2$ | 0.65 |

As is obvious from the results in Table 7, the silver halide photographic material samples of the present invention had excellent storage stability.

TABLE 7

| Photographic Material Sample | Latex Polymer | Latex Amount Coated | Dmin 25° C. 55% | Dmin 50° C. 68% |
|---|---|---|---|---|
| 50 (Comparative Sample) | — | 0 g/m$^2$ | 0.19 | 0.27 |
| 11 (Sample of the Invention) | Polyvinyl Acetate | 20 g/m$^2$ | 0.19 | 0.24 |
| 12 (Sample of the Invention) | " | 40 g/m$^2$ | 0.19 | 0.25 |
| 13 (Sample of the Invention) | Polymethyl Acrylate | 20 g/m$^2$ | 0.19 | 0.25 |
| 14 (Sample of the Invention) | " | 40 g/m$^2$ | 0.19 | 0.25 |
| 15 (Sample of the Invention) | Polyethyl Acrylate | 20 g/m$^2$ | 0.19 | 0.25 |
| 16 (Sample of the Invention) | " | 40 g/m$^2$ | 0.19 | 0.25 |
| 17 (Sample of the Invention) | Polybutyl Acrylate | 20 g/m$^2$ | 0.19 | 0.25 |
| 18 (Sample of the Invention) | " | 40 g/m$^2$ | 0.19 | 0.25 |
| 19 (Sample of the Invention) | Polybutadiene | 20 g/m$^2$ | 0.19 | 0.25 |
| 20 (Sample of the Invention) | " | 40 g/m$^2$ | 0.19 | 0.25 |

While the invention has been described in detail and with reference to specific embodiments thereof, it will be apparent to one skilled in the art that various changes and modifications can be made therein without departing from the spirit and scope thereof.

What is claimed is:

1. A subbing composition for polyesters comprising a dye, a hydrophilic colloid, and a latex, wherein said dye is dispersed in the form of fine solid grains which are substantially insoluble in water at a pH of 6 or less, and are substantially soluble in water at a pH of 8 or more, and said latex has a glass transition temperature of 35° C. or lower.

2. A subbing composition as in claim 1, wherein the fine solid grains have an average grain size of 1.0 μm or less.

3. A subbing composition as in claim 1, wherein the fine solid grains have an average grain size of 0.5 μm or less.

4. A subbing composition as in claim 1, wherein the latex has a glass transition temperature of 5° C. or lower.

5. A subbing composition as in claim 1, wherein the latex has a glass transition temperature of −20° C. or lower.

* * * * *